(12) United States Patent
Uzo

(10) Patent No.: US 7,734,527 B2
(45) Date of Patent: Jun. 8, 2010

(54) METHOD AND APPARATUS FOR MAKING SECURE ELECTRONIC PAYMENTS

(76) Inventor: Chijioke Chukwuemeka Uzo, 11-G Parkwood Dr., South Amboy, NJ (US) 08879

(*) Notice: Subject to any disclaimer, the term of this patent is extended or adjusted under 35 U.S.C. 154(b) by 953 days.

(21) Appl. No.: 10/270,981

(22) Filed: Oct. 15, 2002

(65) Prior Publication Data

US 2003/0061170 A1 Mar. 27, 2003

Related U.S. Application Data

(63) Continuation-in-part of application No. 09/650,293, filed on Aug. 29, 2000, now Pat. No. 6,938,019.

(51) Int. Cl.
*G06Q 20/00* (2006.01)
*G06Q 30/00* (2006.01)

(52) U.S. Cl. .............. 705/37; 705/26; 705/27; 235/383

(58) Field of Classification Search .......... 705/37, 705/27, 65, 14, 41; 713/156
See application file for complete search history.

(56) References Cited

U.S. PATENT DOCUMENTS

| | | | |
|---|---|---|---|
| 5,590,197 A | 12/1996 | Chel et al. | |
| 5,825,881 A | 10/1998 | Colvin, Sr. | |
| 5,835,896 A * | 11/1998 | Fisher et al. | 705/37 |
| 5,839,119 A | 11/1998 | Krsul et al. | |
| 5,845,265 A * | 12/1998 | Woolston | 705/37 |
| 5,883,810 A | 3/1999 | Franklin et al. | |
| 5,930,777 A * | 7/1999 | Barber | 705/40 |
| 5,974,146 A | 10/1999 | Randle et al. | |
| 6,076,078 A * | 6/2000 | Camp et al. | 705/65 |
| 6,105,008 A | 8/2000 | Davis et al. | |
| 6,175,827 B1 | 1/2001 | Cordery et al. | |
| 6,202,051 B1 * | 3/2001 | Woolston | 705/27 |
| 6,236,981 B1 * | 5/2001 | Hill | 705/67 |

(Continued)

FOREIGN PATENT DOCUMENTS

EP 1111528 A2 6/2001

(Continued)

*Primary Examiner*—Evens J Augustin
(74) *Attorney, Agent, or Firm*—Allan Chan; Allan Chan & Associates

(57) ABSTRACT

In accordance with the present invention, a consumer communicates a request for purchase of goods and services to a merchant, the goods and/or services being selected from these listed together with their price quotes on the merchant's computer or website connected to a network, such as the Internet. The merchant then communicates a request for a token and an update key to the clearing server, the token being previously purchased by the consumer and residing on a clearing server device. The update key is used as an authorization to modify the value of the token, i.e., to decrement and to increment. The merchant forwards the purchased merchandise to the consumer. When consumer discontinues making purchases at the selected merchant, the merchant returns the updated token to the clearing server. A new key is necessary to make the next purchase. This is the case even where the requesting merchant is the same as that from whom the last purchase was made. When the token is requested, if the token was used after its initial purchase, the present value of the token is made certain by receipt on the clearing server of informational downloads from the merchants.

45 Claims, 10 Drawing Sheets

Data Paths

U.S. PATENT DOCUMENTS

| | | |
|---|---|---|
| 6,240,187 B1 | 5/2001 | Lewis |
| 6,243,691 B1 * | 6/2001 | Fisher et al. ................... 705/37 |
| 6,246,771 B1 | 6/2001 | Stanton et al. |
| 6,260,024 B1 * | 7/2001 | Shkedy ......................... 705/37 |
| 6,327,578 B1 * | 12/2001 | Linehan ........................ 705/65 |
| 6,938,019 B1 * | 8/2005 | Uzo ............................ 705/65 |
| 7,177,838 B1 * | 2/2007 | Ling ........................... 705/41 |
| 2001/0005839 A1 | 6/2001 | Maenpaa et al. |
| 2001/0014878 A1 | 8/2001 | Mitra et al. |
| 2001/0054003 A1 * | 12/2001 | Chien et al. ................... 705/14 |

FOREIGN PATENT DOCUMENTS

| | | |
|---|---|---|
| WO | WO 01/67407 A1 | 9/2001 |

* cited by examiner

| Token ID | Database Alias | Encrypted Token ID | Encrypted Time and Date | Token Amount | Encryption Key Code | Encrypted Token Amount | Merchant ID | Encrypted Hash value of Token | Encrypted Clearing Server Signature | Unique Random Number | Encrypted IP address of responding clearing server |
|---|---|---|---|---|---|---|---|---|---|---|---|
| 70 | 72 | 74 | 76 | 78 | 80 | 82 | 84 | 86 | 88 | 90 | 92 |

Figure 3

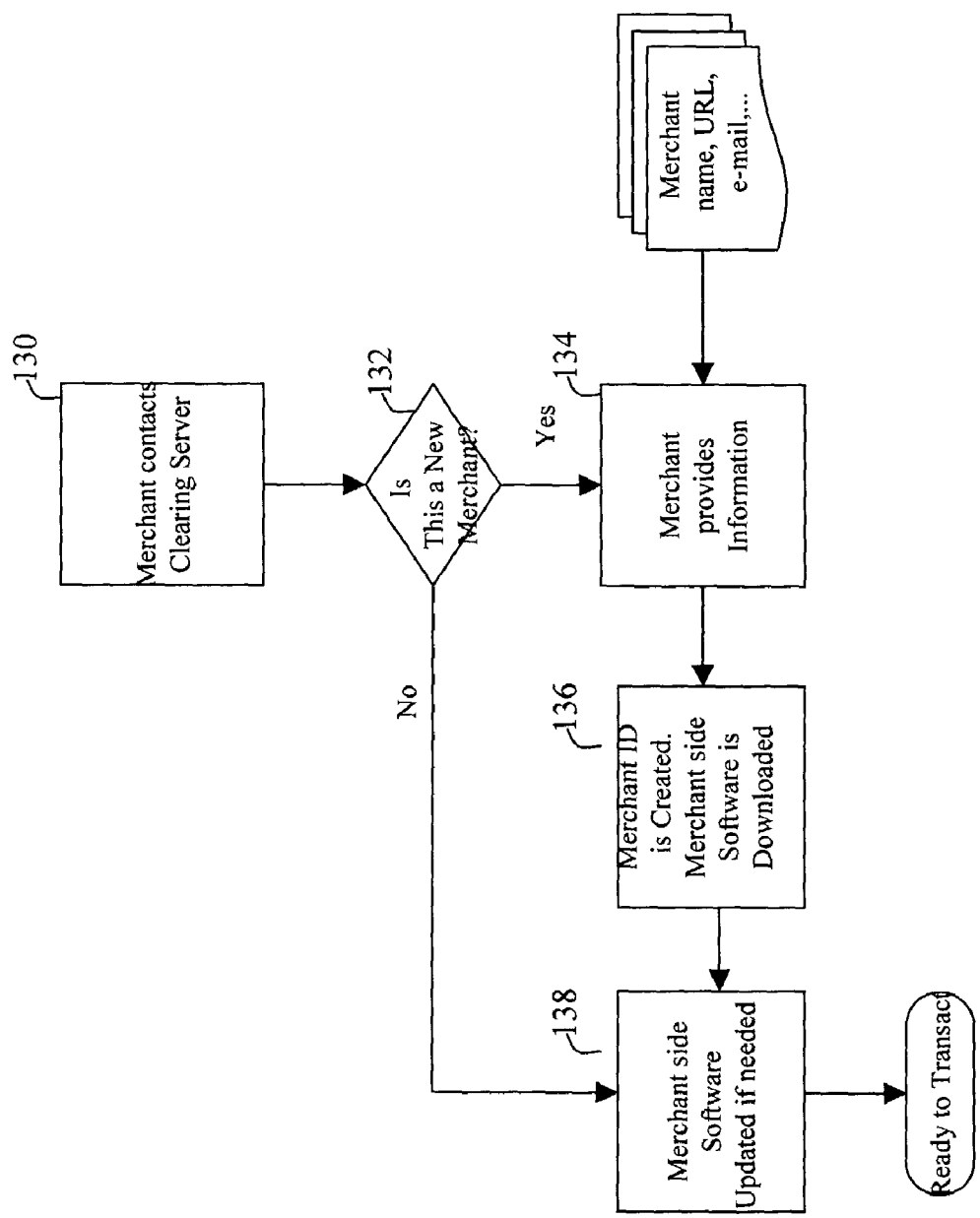

METHOD AND APPARATUS FOR MAKING SECURE ELECTRONIC PAYMENTS

CROSS-REFERENCE TO RELATED APPLICATIONS

The following patent application is a Continuation In Part application based on and claims the benefit of U.S. patent application Ser. No. 09/650,293, filed Aug. 29, 2000 now U.S. Pat. No. 6,938,019.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to making electronic payments on the Internet, and more specifically to providing a secure electronic money proxy to enable unrestricted commerce on the Internet or similar network.

2. Description of the Background of the Invention

At a minimum, electronic payments involve transmissions between three parties, a consumer, a merchant, and any credit or money disbursing institution, e.g., a bank or a credit union, (creditor). In exchange or in payment for goods and/or services, the consumer gives or issues a non-cash electronic instrument or a money-proxy to the merchant. For the remainder of this document such an instrument will be referred to as a token. The token includes the money balance of the consumer and other identifying information. The creditor validates the token, by verifying that cash or credit backs it. The creditor's validation enables the merchant to release the goods and/or services purchased to the consumer.

It is possible for the consumers and merchants to engage in transactions without the creditor. However, in such two-party transactions the issuance of the token by the consumer will be synonymous with creating money. Such eventuality is not suitable for the merchant, because he or she will be asked to accept the token without any assurances as to its value. It is presumed that the merchant must be able to use this token either in further trade, e.g., to purchase replacement merchandise, or redeem it for generally accepted currency.

Another drawback to the two party transactions involving multiple uses or spending of the token is the current state of electronic encryption. It is not possible with today's encryption technology to guarantee transactional security.

Three party transactions, including the consumer, merchant, and creditor, must be considered the minimum number of participants needed for electronic payments. However, every electronic payment transaction may involve different consumers and merchants, each with a different creditor. Furthermore, such electronic payment transactions may allow several possible methods of payment.

An efficient transaction structure would require the introduction of a fourth party. This fourth party will validate every consumer's token, irrespective of which creditor the consumer uses or the type of payment instrument, e.g., credit or debit card, credit line, check, or cash, used to purchase the token. The fourth party ensures that the consumer's token does in fact have its stated cash value and thereby eliminates merchant concerns regarding the token monetary balance. Therefore the token may be easily accepted by the merchant, redeemed as cash, or used to make merchandise replacement purchases.

Developments in the electronic payment area may be divided into two categories:

1. The first category consists of those approaches that address a subset of a payment transaction but are not in themselves complete solutions. These make up the vast majority of electronic payment developments. An example of this category is best described in U.S. Pat. No. 5,987,140. This patent presents a method of secure communication between the consumer, merchant, and creditor where authorizations are passed from the creditor to the merchant and to the consumer. Another example of this category is described in U.S. Pat. No. 5,999,91, where probabilistic polling of the merchant is used to permit the creditor to obtain an approximation of the consumer's spending. Moreover, U.S. Pat. No. 6,035,402 describes the use of an electronic Certification of Authority, used to authenticate the identity of the consumer, merchant, and/or creditor.

2. The second category of developments consists of those developments that may be considered complete solutions, designed to conclude a transaction between the consumer and the merchant from initiation or contract to completion or sale. An example of such approach is described in U.S. Pat. No. 5,952,638. This patent describes an electronic transaction initiated by a consumer who transmits a request for payment information to a merchant. The merchant's response is authenticated, after which the consumer generates an electronic payment. This electronic payment is then forwarded to the merchant as payment for the goods and/or services.

The complete solutions category of approaches can in turn be subdivided into solutions implemented exclusively using software and solutions requiring special hardware, e.g., smart cards, to operate. The special hardware is generally designed such that neither the merchant nor consumer can access or modify information stored on the hardware. An example of such hardware based electronic payment invention is described in U.S. Pat. No. 6,061,664. In that patent, a consumer can communicate with the merchant and conclude a transaction with a payment. However, such transaction requires specialized hardware including a smart card and a phone or voice communication device.

An example of a solution implemented using exclusively software is described in U.S. Pat. No. 6,029,150. In that patent, each consumer is burdened by an obligation to maintain an account with at least one of several agents. The consumer receives a price quote from a merchant, authenticates it, and sends that quote to an agent. The merchant must have an account with that agent. The agent then in turn issues an authenticated token to the consumer. The consumer then forwards all or part of that token to the merchant as payment.

The software solutions may permit exchange of the tokens between the consumers and merchants. The tokens can be stored, retrieved, and exchanged multiple times between the consumers and merchants to pay for the goods and services. In other words, the multi-use token system mimics the characteristics associated with the use of physical cash. Alternatively, tokens may be used no more than once and thereafter modified or destroyed in a single-use token system. The complete software-based solutions are further categorized into real time and non-real time token systems.

The non-real time token systems include electronic verification, negotiation, secure communication, authentication, payment instrument selection, etc. Although transactions can be concluded using these non-real time systems, the function of such systems is conceptually akin to making payments by check to the merchants who will wait three days for the check to clear before shipping or releasing the goods and services. Such systems lack "immediacy". A good example of the non-real time token systems is described in U.S. Pat. No. 6,029,151. In this patent, charges incurred by the consumer are charged to his/her Internet Service Provider (ISP). This requires active participation of the consumer's ISP in the transaction. Settlement of charges using this method occurs only after the consumer receives his or her bill and pays it.

The real time token systems use the tokens to complete transactions in real-time. This is achieved by the consumer making a payment for goods and/or services through sending a token to the merchant; the merchant verifies and decrements the token; after which the goods or services purchased are released. The payments made through the real-time token systems are not any of the following actions: a negotiation to choose a form of payment, a method for verifying if the consumer is credit-worthy, a secure channel to communicate between transaction parties, a method to create a token. In their function, the real-time token systems are conceptually akin to cash transactions. Pay cash; Receive goods. While the goods may take time to ship or download over computer networks, the purchase transaction has, in essence, been consummated.

There exist various types of real-time token systems. First, there are those systems that depend on, or specify a particular protocol through the use of which electronic payments are transacted. An example of such protocol dependent real-time token systems is described in U.S. Pat. No. 6,061,665, which specifies a method of communication between the consumer and merchant having a dynamically negotiated payment protocol, message format, and suitable payment instrument.

Another type of real-time token system requires one or more parties in addition to the consumer, the merchant, and the creditor. Without these additional required parties, e.g., a Certificate Authority for issuing encryption/decryption keys, the transaction cannot be concluded.

Finally, another type of the real-time token system requires a priori arrangement in which the consumer or merchant would not otherwise engage in except for the purpose of prosecuting electronic payments. Such system may require that each merchant maintain an account with at least one of several creditors, or that each consumer maintain an account with every merchant with whom they transact, or that each consumer obtain encryption and decryption keys. An example of such real-time token system requiring a priori arrangement is described in U.S. Pat. No. 5,930,777. This patent describes a method for charging a consumer for the use of online information. The method requires the consumer to establish an account with at least one third party "banker" and to purchase "credit units" that have denominations that can be as small as fractions of one cent. The consumer may have accounts with more than one "banker" and may use these credit units to make on-line purchases.

In view of the foregoing discussion, it is clear that there is a need for a complete, protocol independent, real-time payment, single use, token system that is software based and does not depend on additional hardware. The system must be able to execute multiple consecutive transactions between the same consumer and a merchant, require one-time authentication, which will produce significant reductions in networking and computational overhead. The system should not require a Certificate Authority or additional agents beyond the consumer, merchant, and creditor-clearing server (representing a fourth party).

OBJECTS AND SUMMARY OF THE INVENTION

It is therefore an object of the invention to provide apparatus and a method for making secure electronic payments that overcomes the shortcomings of the above-described systems.

These and other objects of the invention will become more apparent from the discussion below.

In accordance with the present invention, consumers and merchants use computing devices connected to a network, such as the Internet in a wired or wireless manner, wherein the consumer connects to a clearing server device to purchase a token, the consumer then connects to the merchant's computer or website to obtain price quotes of goods and services, selects the goods and/or services to be purchased, provides consumer identifying information, and then communicates a request for purchase to the merchant. The merchant then communicates a request for the consumer's token and its update key to the clearing server. The consumer's token and update key are then sent by the clearing server to the merchant. The update key is unique for each token and authorizes the merchant to modify the value of the token for each transaction performed by the consumer. It also authorizes the merchant to record each such transaction.

Once the token is received by the merchant, the consumer can perform very many transactions very rapidly, because the consumer's token is debited or credited locally by the merchant for each transaction and there is no network overhead. Any transaction translates into either a debit (decrement) or a credit (increment) to the consumer's token. The transaction amounts can be very small as the time and resource costs for each transaction is also very small. The merchant does not have to contact the clearing server again after the initial authorization except if the token expires or is retrieved by the clearing server. Each token is set by the clearing server to expire after a fixed time interval.

Each modified token and the records of transactions performed on it are returned to the clearing server device either after a period of inactivity, which indicates that the consumer has concluded his transactions, or whenever the clearing server device requests that the token be returned. In either case, the update key used by the merchant is invalidated, the token with its transaction records are returned to the clearing server, and the copy of the token residing with the merchant is destroyed. When the next request for the token is received by the clearing server device, from the same or a different merchant, a new token and a new update key is created and sent to the merchant.

As an aspect of the invention, if the clearing server receives a token request from a new merchant for a token that still resides with a previous merchant, the clearing server first retrieves the token and transaction records from the previous merchant, the token money balance is adjusted to reflect these transactions and an update key along with a new token is returned to the new merchant. The token is in effect leased to each merchant with whom the consumer wishes to perform transactions. It is retrieved from that merchant by the clearing server, modified, and sent to a second merchant if the consumer wishes to perform transactions with this second merchant. The consumer's token can only exist with one merchant at a time and so the consumer cannot conduct simultaneous transactions with two or more merchants at once.

In another embodiment, the request from the consumer to the merchant may include instructions by the consumer to the merchant to consummate purchases or receive credits in the future. In this embodiment, instead of making an immediate purchase on connecting to the merchant's computer or website, the consumer places a contingent order by providing instructions to the merchant regarding (1) specific goods and services to be purchased, (2) the preferred price at which such goods and services will be purchased, and (3) the token identifying information. When the merchant decides to sell the selected goods and services at the consumer's preferred price, the merchant consummates the transaction by (4) requesting the token and update key from the clearing server. The token is then debited by the preferred prices specified in the consumer's request. In this embodiment, the consumer can place several contingent orders with several merchants and only one merchant will be able to fill the order, provided that the token money balance is enough to fill only one order.

To illustrate how this happens, when one merchant fills the order it downloads the token from the clearing server, debits or decrements it for the specified amount, and then releases the goods and/or services to the consumer. A request from a second merchant to the clearing server would require that the clearing server retrieve the token and its transaction record from the first merchant, update its own database records, generate a new token, and then send the token to the second merchant. The attempt to decrement the token at the second merchant will show that the token has insufficient funds. In fact, if the token money value is used up at the first merchant there will be no token download to the second merchant or to any subsequent merchants.

In another embodiment of the present invention, the consumer may conduct simultaneous transactions with two or more merchants. This occurs where the clearing server does not send the whole token to a requesting merchant but instead creates and sends a fraction of it to the merchant. This is called a fractional token. A fractional token does not have the entire monetary value of the consumer but only a fraction of it. The consumer's remaining money balance is held either on the clearing server or as one or more tokens at one or more merchants. In this embodiment, the consumer may have a spending limit with a particular merchant. If the money balance of the consumer's token at the clearing server exceeds this limit, then a request from that merchant to the clearing server for the consumer's token results in the creation of a fractional token. The fractional token that the merchant receives will have a value that may equal but not exceed the spending limit set for that consumer at that merchant.

This means that the clearing server creates a token which does not hold the entire money balance of the consumer but instead holds a fraction of it equal to the consumer's spending limit for that merchant. This fractional token is downloaded with an update key to the merchant. In this embodiment the following occurs: (1) The fractional token downloaded to the merchant has a value that is equal to or less than the spending limit for the particular consumer; (2) The consumer can make purchases at that merchant only for amounts up to the value of the fractional token; (3) A request from a second merchant to the clearing server for the consumer's token can be serviced without first retrieving (or recalling) the consumer's fractional token from the first merchant. Instead the clearing server generates a second token with a value equal to the consumer's money balance remaining on the clearing server. This second token, is also called a fractional token, and is downloaded with its own update key to the second merchant; (4) The second merchant or any subsequent requesting merchants may also have spending limits for the consumer, in which case, the clearing server will repeat the process of creating and downloading fractional tokens, with each token value equal to the consumer's spending limit for each requesting merchant; (5) A merchant will receive the entire token from the clearing server if the consumer's spending limit for that merchant exceeds the consumer's token balance at the clearing server.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 3 is a record layout diagram of a token utilized for making payments according to the invention.

FIG. 4*a* is a flow diagram for registering and loading merchant side software onto a computing device.

DETAILED DESCRIPTION OF A PREFERRED EMBODIMENT OF THE INVENTION

The method and apparatus for making secure electronic payments in accordance with the present invention, involves making electronic payments over the Internet. The present invention is a complete, software-based, real-time, payment system that does not depend on additional hardware, is protocol independent, and uses symmetric or asymmetric (public/private key) encryption. The invention does not require a Certificate Authority or additional agent beyond a consumer, merchant, creditor, and a clearing server. The invention may be used to make payments, to transfer money as well as to receive refunds, promotions, credits, etc. The payments can be completed in real time, i.e., immediately; or delayed, i.e., a request or bid for a conditional purchase can be submitted. Furthermore, payments can be made item by item; or items can be grouped together and paid for at one time, i.e., using a shopping cart; or a fixed amount of products or services can be delivered to the consumer over a fixed period of time with one payment, i.e., payment for subscription.

Figure 1:
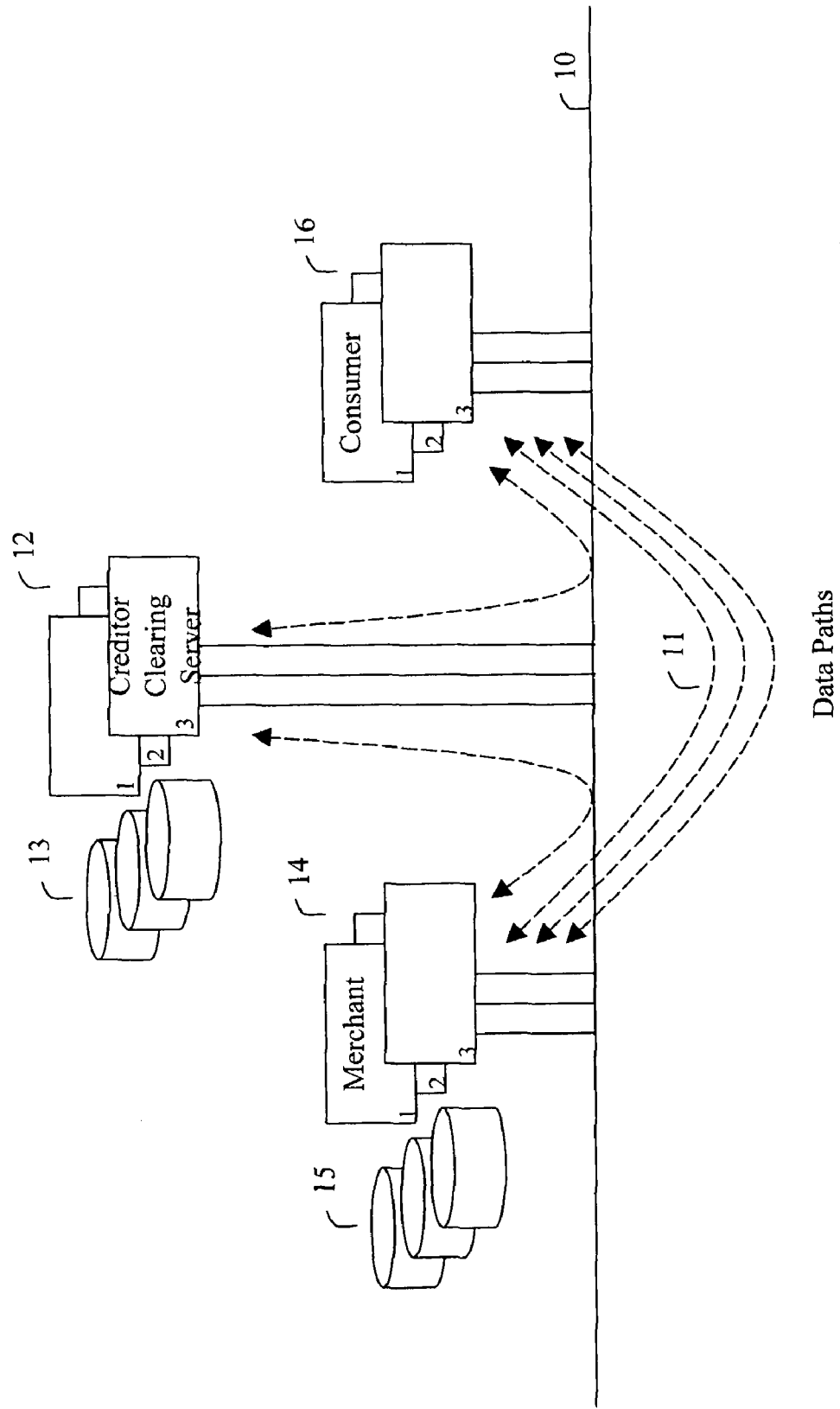
FIG. 1 is a diagram representing a network environment of the present invention.

Referring to the drawings, FIG. 1 shows computing devices of the invention interconnected via data paths 11 over a network 10. In the preferred embodiment of the invention, the network 10 is the Internet. The computing devices are functionally grouped as merchant 14, consumer 16, and creditor clearing server 12. The creditor clearing servers 12 include clearing server databases 13 and processes for managing them. The creditor clearing servers 12 also interact with creditors, e.g., banks and credit card companies, whose authorization attaches a value to electronic money called a token which is used to perform transactions between merchants 14 and consumers 16.

The computing devices 12, 14, and 16 may take the configuration of any computer ranging from mainframes and personal computers (PCs) to digital telephones and hand held devices, e.g., Palm Pilots™. In one illustrative embodiment of this invention shown in FIG. 2, such computing devices may comprise a bus 30, which is connected directly to each of the following: a central processing unit (CPU) 32; memory 34; a system clock 36; a peripheral interface 38; a video interface 40; an input/output (I/O) interface 42; a communications interface 44; and a multimedia interface 46. The common bus 30 is further connected via the video interface 40 to a display 50; via the I/O interface 42 to a storage device 52, which may illustratively take the form of memory gates, disks, diskettes, compact disks (CD), digital video disks (DVD), etc.; via the multimedia interface 46 to at least one multimedia component 56; via peripheral interface 38 to one or more peripherals 58, such as a keyboard, a mouse, navigational buttons, e.g., on a digital phone, a touch screen, and/or writing screen on full size and hand held devices, e.g., a Palm Pilot™; via the communications interface 44, e.g., a plurality of modems, to a network connection 60, e.g., an Internet Service Provider (ISP) and to other services, which is in turn connected to the network 10, whereby data paths 11 (FIG. 1) are provided over the network 10 and between the computing devices 12, 14, and 16 (FIG. 1) and, in particular, the common bus 30 of each of these computing devices; and furthermore, via the communications interface 44 to the wired and/or the wireless telephone system 54.

The creditor clearing server 12 is hereinafter referred to as the clearing server 12 or clearing server; the clearing server database 13 is hereinafter referred to as the clearing server database; the merchant 14 is hereinafter referred to as the merchant; the merchant database 15 is hereinafter referred to as the merchant database and the consumer 16 is hereinafter referred to as the consumer. The aforementioned terms may still be used with their identifying numbers (e.g., "16" in consumer 16) to eliminate ambiguity.

Consumer

Referring back to FIG. 1, to participate in a transaction a first-time consumer 16 must purchase a token. The detailed description of the token is provided below. This may be achieved using commercially available browsing programs such as the Microsoft Explorer and Netscape Navigator to contact the clearing server 12. There the consumer 16 provides personal information, pays for the token, the electronic money representing cash, and then receives a token reference number which is split into a token identification number (the token id) and a Personal Identification Number (the PIN number). The token id/PIN number combination is entered by the consumer at each merchant site to perform transactions. The consumer uses accepted payment methods, e.g., a credit card, a debit card, an automated teller machine (ATM) card, an electronic check, or an anonymous prepaid card to pay for the token. The consumer may optionally be required to select a login name and password, which may be used if the token id and PIN number are forgotten.

The inventive anonymous prepaid card may also be used by the consumer to make token purchases. It has a fixed face value, (e.g., $50) and may be purchased offline, (i.e., at newsstands and grocery stores). The anonymous prepaid card represents records created in the clearing server databases 13. These records are similar to records created when a token is purchased online with a commonly accepted payment instrument. The key difference is that each anonymous prepaid card database record is identified through a unique numeric or alphanumeric reference number in lieu of a consumer's name and personal information. The unique reference number is printed on the anonymous prepaid card and is required to activate the card and generate a token for the consumer. The anonymous prepaid card is discussed in detail below.

Offline payment methods such as checks, money orders, and cash may also be used for token purchases but will mean that those portions of the transaction will not be completed online and so the token will not be issued until they are completed.

Merchants like consumers also register with the clearing server 12 and provide information before they can begin accepting token payments. Both consumer and merchant information provided is stored in the clearing server databases 13, which comprise various records including (1) merchant information, (2) consumer information, (3) anonymous consumer prepaid card and/or cash information, and (4) information specific to the clearing server 12, such as the computing device signatures, IP address, clearing server database alias, and encryption key codes.

As mentioned above, to purchase the token the consumer using the browsing program provides information, such as credit, debit, or prepaid card reference numbers into a page on the clearing server 12. The information is stored in the clearing server database 13 as a unique consumer record and is used to create the token and update its records. The token created is given a unique reference number, split into a token ID and PIN number. The consumer uses this token id and PIN number for all subsequent transactions involving the purchased token. The consumer may optionally select a password and a login id, which may be used if the token id/PIN number is forgotten. Although all the information received may be stored in one table, on the clearing server database, using three tables as described in an illustrative embodiment of the present invention permits splitting the information into:

a. Static consumer information records comprising the following fields: a consumer ID; a first, middle, and last name; e-mail; city and country; phone number; software downloaded (Y/N); and software version. The software referenced in the last two fields will be discussed below.

b. Consumer secret information records comprising the following fields: a consumer ID; a token ID, a payment instrument name and type, e.g., visa, master card, debit card, prepaid card; a purchase instrument number and expiration; a login name; an encrypted password; an encrypted password reminder; the dollar value token purchase; date and time; and other information such as approval codes from creditors.

c. Changing token information records comprise the following fields: a consumer ID; a token ID; a random number used to generate an update key; a requesting merchant ID; a request time; request date; fractional token data; a database alias; a token hash value; an encryption key code; an IP address and other data.

The anonymous prepaid card records have a schema similar to the consumer records. It differs in that the record has been pre-created in the clearing server database 13 (FIG. 1) and has as its token ID a number assigned to the anonymous prepaid card. The anonymous prepaid card record has numbers in the fields for first, middle, and last names, city and country names. Instead of entering his or her name, the consumer 16 enters the anonymous prepaid card number which the clearing server 12 authenticates by confirming that it exists in its clearing server database 13 and is associated with an inactive pre-created record. If the number is authenticated, the clearing server 12 generates a token with the value or money balance specified in the pre-created record. The customer 16 then receives the token id/PIN of the new token. This allows the consumer 16 to perform transactions and to view the transaction history of the token (i.e. view selected fields in the transaction records of the token). The anonymous prepaid card may have email with which the consumer 16 can communicate with the clearing server 12 or with the merchants 14 to resolve disputes.

Merchant

The merchant 14 using computing devices, desiring to participate in the inventive process will also register at the clearing server. Using commercially available Internet browsing programs, data paths 11 to the clearing server 12 are established and information, such as the name, e-mail, uniform resource locator (URL) or the TCP/IP address associated with the merchant's 14 computing device or Internet website, bank, credit and creditor account number are entered. This information is used to create merchant records on the clearing server database 13 before the merchant can download software from the clearing server 12. The merchant records hold static information about the merchant 14, detailed transaction information for each token, and aggregate transaction information. A table with a similar schema is created by the merchant 14 in a local merchant database 15. The merchant database is specific for the invention and is created and managed by merchant side software installed on merchant 14 during registration at the clearing server 12. The merchant database 15 is accessed when the clearing server 12 polls the merchant 14 to retrieve (i.e. upload) a token with its transaction records.

As will be discussed below, the clearing server 12 may thus obtain the amounts spent by the consumer 16 at the merchant 14 website and the records for each individual transaction. The clearing server 12 uses this information to update the token balance and update its own consumer transaction records on the clearing server database 13. In the illustrative embodiment of the present invention, the merchant information records, similar to the consumer information records, may be maintained on the clearing server 12 as the following record sets:

a. Static merchant information records comprising the following fields: a merchant ID; name; URL; e-mail; address; login name; password (encrypted); a type of merchant business; date created; a software version; an encryption code; a merchant creditor's name; a creditor account number; a creditor routing number; a merchant encryption key; and an authorization flag (y/n).

b. Aggregate merchant and token information comprising the following fields: a merchant id; a token id (foreign key); sum of token id specific purchases; sum of token id specific credits; a total merchant revenue; a date; and a time.

c. Merchant transaction information records comprising the following fields: date; time; merchant id; token id; transaction amount; transaction id; product or service type; token credits; and confirmation number.

Clearing Server

Finally, the clearing server database 13 comprises records containing fields specific to the clearing server 12. The clearing server information records comprise the following fields: a clearing server signature; database alias; IP address; fully qualified domain name; encryption key codes; test messages (unencrypted); test messages (encrypted). Data in these fields are used in creating a token or in creating a message on the clearing server's "authentication page" to be used for authenticating merchants and consumers. The clearing server signature field is extracted from the clearing server information record, encrypted, and written to the token.

The merchant 14 (FIG. 1) receives a unique encryption key on registration from the clearing server 12 and a digital copy of the clearing server signature. This key and the unencrypted digital copy of the clearing server signature may be embedded within the merchant software downloaded by the merchant at registration. The clearing server 12 encrypts some information on the token using this key and one of a number of possible encryption algorithms. The encryption key code is an alias for the particular key and encryption algorithm used by the clearing server 12. This encryption key code is written to the token. The token created for a merchant has encrypted fields on it that can only be decrypted by that merchant using the encryption key it obtained at registration. Periodic updates of the merchant's encryption key and the clearing server signature improve security. A merchant 14 using an old encryption key cannot decrypt information written with a new encryption key.

The "test messages" fields hold data, which is stored with and without encryption. The clearing server 12 provides the encrypted data, which the merchant 14 may access and attempt to decrypt it. The results are then uploaded to the clearing server 12. The merchant 14 will receive a confirmation for successful decryption. The data may instead be unencrypted and merchant 14 would then be required to encrypt it and upload the results to the clearing server 12. This process is used in every "handshake" (i.e., initial communication) between the clearing server 12 and the merchant 14. The present invention may use commercially available encryption algorithms.

It is appreciated that one skilled in the art could have used other methods of database design without departing from the scope of the invention.

Token

The token issued by the clearing server 12, holds encrypted and unencrypted data in a format that permits access to specific portions of the data. The format of the token may vary from numbering of each data segment to giving each data segment a specific header. Conceptually, the token may be made to resemble a record with fields. Encryption of data in token fields is performed on the clearing server 12, while decryption is performed by the merchant 14. Encryption and decryption of the token is performed by software, is invisible to the merchant 14, and does not depend on any particular encryption algorithm. Any commercially available secure encryption methods, e.g., symmetric or asymmetric public/private key, may be used.

The token contains several fields designed for authentication. As a result, the merchant 14 using any or all of several alternative methods involving different fields may authenticate the token. For example, decrypting the clearing server's signature field may authenticate a token to the merchant 14.

Each token is comprised of encrypted information, which may include at a minimum, the token id which is unique for each token, the token's money balance (or cash value), and a random number. The token id is associated with the consumer 16 in the database records of the clearing server. Additional information such as date and time, encrypted hash value and other unique fields containing specific information are included in the token to enable both the merchant 14 and the clearing server 12 to authenticate the token. The additional fields may be unnecessary if the communication is between the clearing server 12 and a trusted merchant 14. The token is downloaded into the computing device of the merchant 14 where it resides in memory 34 (FIG. 2) of the merchant 14 computing devices and is therefore difficult to access or tamper with. Moreover, after each transaction session, the token and all its transaction records are uploaded to the clearing server 12 and removed from the merchant database 15. A new token is created for subsequent transaction sessions. A transaction session refers to the period during which a token resides with a merchant 14 and can be debited or credited. If the token expires or is recalled by the clearing server 12, that transaction session ends. If the merchant 14 immediately after a token is recalled, requests the a token with the same token id from the clearing server 12, it will receive a different token; The token it receives will have the same token id but several different fields, including new random number and time fields. The clearing server 12 always downloads a new token to the merchant 14 for each new transaction session.

The token is dynamically generated from the information stored in tables of the clearing server databases 13, and holds encrypted and unencrypted information identifying the consumer. A symbolic representation of a token is provided in FIG. 3. The fields of the token address the following functions:

1. The token id field 70 uniquely identifies the token. It is associated with a consumer 16 in the database records of the clearing server database 13.
2. A database alias field 72 is a reference name to identify the clearing server database 13 (FIG. 1) in which token record resides. Since there might be several clearing server databases 13, this field tells any clearing server 12 (FIG. 1) which clearing server database 13 to contact in order to obtain consumer information with which to create or update the token.
3. An encrypted token id field 74 is only readable by the clearing server 12 (FIG. 1), which can decrypt this field and check it against the unencrypted token id to make sure the token is authentic.
4. An encrypted date and time field 76, stores when the token was created. Every time the clearing server 12 (FIG. 1) modifies the token, this field 76 is updated in the token and on the clearing server database 13 (FIG. 1). The token may be given a fixed life expectancy after which time transactions on it are halted and the merchant 14 uploads it to the clearing server 12 with its transaction records. The merchant 14 can follow the upload with a request for the same token. It will receive a new token with the same token id.
5. A token amount field 78 is read by the merchant 14 (FIG. 1) and used as the beginning balance in the merchant database 15 on which transactions on the token are recorded. It is also modified by the merchant 14 (FIG. 1) using the update key.
6. An encryption key code field 80 is a code for the key and algorithm used by the clearing server 12 (FIG. 1) to encrypt the information on the token. The merchant 14 needs this information to decrypt other fields on the token.
7. An encrypted token amount, field 82, is decrypted and compared against the unencrypted token amount, field 78. The difference equals the sum of transactions performed at the merchant 14. If there is a discrepancy, merchant 14 who uploaded the token is polled to verify transaction record uploads received. When the token is recalled from the merchant 14, transaction records on the clearing server are updated and the encrypted token amount in the field 82 of the token is rewritten to match the unencrypted token amount in the field 78.
8. A merchant ID field 84 is the unique identification number of the requesting merchant (FIG. 1) who currently holds the token. This number is unique to each merchant and is created at registration.
9. A hash value of token field 86 represents a number obtained by running specific fields on the token through any commonly available hashing algorithm to generate a unique value. This value is encrypted. The merchant 14 (FIG. 1) decrypts this value with its key and stores it. The merchant 14 then runs the same token fields through the same hashing algorithm to obtain a number which is compared against the stored decrypted value of this field 86. If the numbers match the token may be assumed to be authentic.
10. Clearing server's signature field 88 is used to identify the clearing server 12. Decrypting this field 88 produces the clearing server's signature.
11. A unique random number, field 90, holds a unique random number, which is written onto the token to make it unique for each transaction session.
12. Field 92 holds the encrypted IP address of the responding clearing server 12. The merchant 14 decrypts this field using its key and always uploads token and transaction records to this address.

The token has several security features, all of which do not have to be used at the same time. However, the present invention may be arranged such that the higher the dollar amount of the purchases, the more checks are performed on the token. These checks are performed by the merchant when it receives a token from the clearing server 12 and by the clearing server 12 when it receives uploads from the merchant 14. The merchant 14 must return each upload with an authentic token, which it received from the clearing server 12, and whose balance and hash value it has modified to reflect all the transactions performed on the token. A token on which transactions have been performed will have two fields modified (field 78 and fields 86), otherwise it would not be considered authentic and the clearing server 12 would reject the token and the transaction uploads from the merchant 14.

Anonymous Prepaid Card

The anonymous prepaid card represents stored monetary value residing in a record on the clearing server database 13. It bears a unique reference number, which is the key to a record in the clearing server database 13. The anonymous prepaid card is used by a consumer 16 to purchase a token 68 without having to provide personal information. The consumer 16 who purchases the anonymous prepaid card will enter the anonymous prepaid card number at the clearing server 12. The clearing server 12 authenticates the number provided, activates the pre-created record, and then generates a token 68 and sends a display of the token money balance to the consumer 16 along with a token id/PIN number. Since the consumer 16 has made payment, the token 68 is backed by monetary funds and so the consumer 16 can make purchases from a merchant 14 as described above.

To increase security, activation of the anonymous prepaid card may require an additional set of unique identifiers, such as a PIN number, in addition to the unique reference number on it. Although its unique number is written on a physical medium which the consumer purchases, the number can also be delivered digitally to the consumer over a secure medium. The anonymous prepaid card may also bear an email address, which may be used to send and receive information from the clearing server 12 as well as for transaction dispute resolution.

The token 68 purchased with an anonymous prepaid card can be "refilled" from a credit line or bank account. A refill is the transfer of funds to the token 68 from a credit card or bank account. This results in loss of anonymity, since the consumer 16 has to provide a name and personal information associated with the credit line or bank account from which the funds are being transferred. This is not the case with cash refills, which may be performed offline at a merchant or vending machine.

Figure 8:
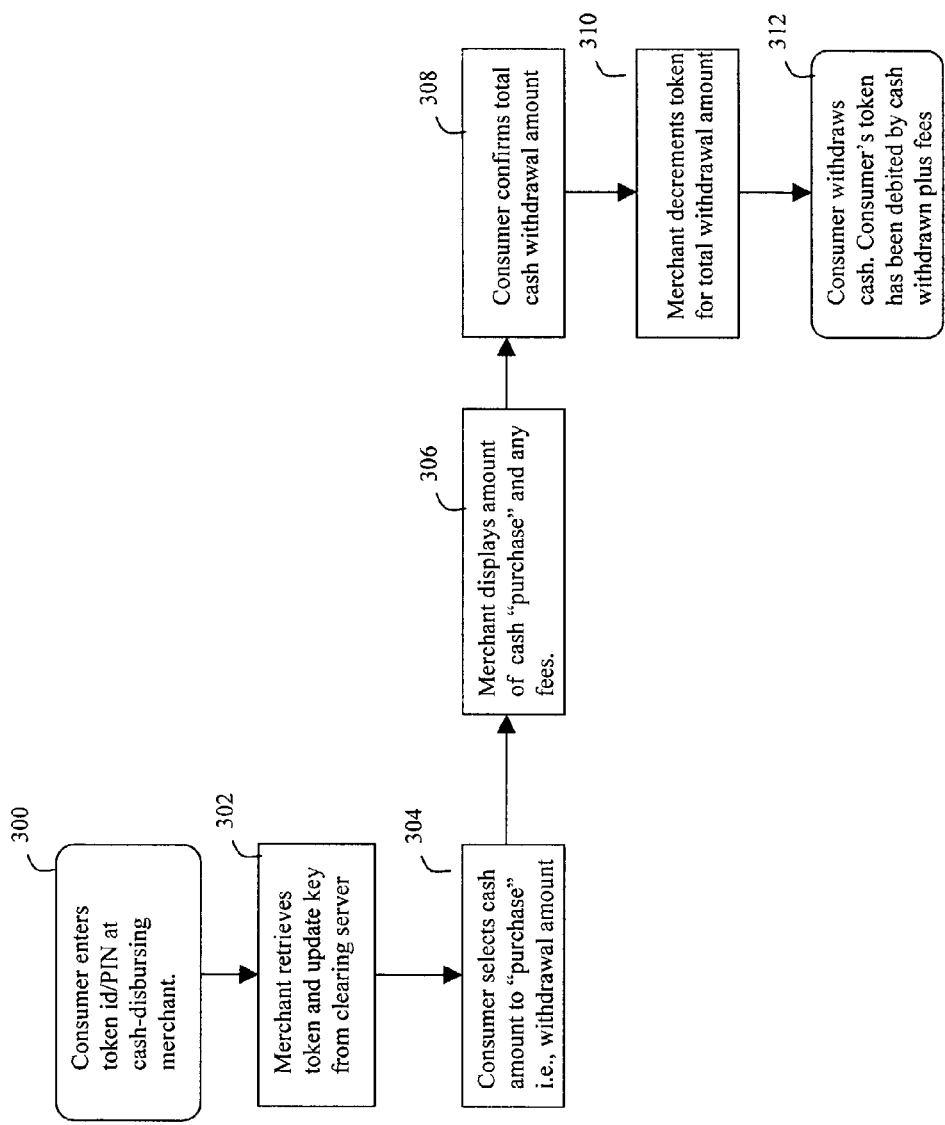
FIG. 8 is a diagram representing the sequential flow of steps when a consumer draws cash from a token.

The anonymous prepaid card may have a magnetic stripe that holds its unique number. In that case, it can be used to withdraw cash from the token 68 although this requires registered merchants 14 who disburse cash, such as banks, ATMs, and check cashing locations. Such merchants can be seen as selling cash. When the consumer 16 selects an amount of cash to "purchase", that selection represents the amount of cash the consumer 16 wishes to draw from their token 68. The merchant 14 "reads" the unique reference number on the card, which is the same as the token id, and then prompts the consumer 16 to enter the PIN number. The token id/PIN number and withdrawal amount is sent by the merchant 14 to the clearing server 12, which downloads the token 68 to the merchant 14. The merchant 14 then decreases the token 68 by the value of cash purchased by the consumer 16. The cash disbursed is the amount debited from the token 68 less any fees charged by the merchant 14. The same transaction i.e., cash withdrawal, can be performed by entering the token id and PIN number at a merchant 14 that disburses cash, and selecting for purchase, the amount of cash to draw from the token. The merchant needs to provide an interface for entering the token id/PIN number e.g., a key pad/monitor. FIG. 8 describes cash disbursement from a cash-disbursing merchant. It is explained below under the heading "Cash Disbursement".

Merchant Software

Merchant software is downloaded from the clear server 12 after merchant registration and installed on the merchant 14. The software can also be installed from any computer readable medium e.g., diskettes, compact discs (CD), digital video disks (DVD). The merchant will still need to register with the clearing server 12. The merchant software requires access to the clearing server 12.

The process of downloading the merchant side software is shown in FIG. 4a. In step 130, the merchant using the Internet browsing software connects to the clearing server 12 (FIG. 1). If in step 132 it is determined that the merchant 14 has not been previously registered, the merchant is asked to register in step 134 and provides information which is used to create a merchant record on the clearing server database 13. The clearing server 12 creates a record for the merchant and assigns the merchant a unique merchant ID in step 136. This is used with a merchant PIN for authentication and to access its transaction records on the clearing server 12. After registering or if previously registered, the merchant 14 is allowed to download the merchant-side software or obtain software updates.

The merchant side software performs functions comprising the following:

1) Communicating with the clearing server 12 (FIG. 1) by
   a) sending it a token id/PIN number combination to retrieve a token 68
   b) returning a token with all transaction records after a period of inactivity or in response to a request from the clearing server. It invalidates the update key in either case.
   c) periodically uploading data on all transactions to the clearing server; and
   d) responding to polls and performing 1(b) above.

2) Maintaining the local merchant database 15 (FIG. 1) of all transactions conducted. In this merchant database 15, token ids and transaction records are stored. No consumer personal or credit information is seen, stored or used.

3) Performing "tiered" authentication of the tokens 68 (FIG. 1) received from the clearing server 12 by performing a single check or multiple checks of the token 68 fields depending on the price or value of the transaction. This may involve decrypting certain fields of the token 68, and/or running specific token data through a hashing algorithm. This hashing process is first performed on the clearing server 12 and the results are encrypted and written onto the token 68. The merchant 14 (FIG. 1) decrypts the result and compares it with its own hash output. If the results differ the token 68 is not genuine. The merchants 14 who want to increase protection for their goods or services may set the merchant side software to perform multiple token 68 authentications. This will generally produce an increase in processing time.

4) Communicating with the merchant 14 to authenticate token id/PIN numbers and confirm payment for each transaction. The communication comprises
   a) receiving a transaction initiation request or bid;
      i) a request to authenticate the customer's token id/PIN to the merchant 14: The consumer 16 connects to the merchant 14 and enters a token id and PIN number. This is passed to the merchant side software, which may authenticate the token id locally and then forward the token id/PIN combination to the clearing server with a request to retrieve the associated token 68 with its update key. The token 68 with update key is then downloaded to the merchant side software on the merchant 14.
      ii) a purchase request after token id/PIN authentication. Step 4a.(i) above has been preformed. After the token is downloaded to the merchant side software, purchase requests from the merchant 14, which include product information and the product purchase price, are then serviced locally by the merchant side software; No further confirmation is needed from the clearing server 12. Each new transaction request is recorded in the merchant database 15, the value of the token 68 is modified by changing the value of the field 78, using the update key. A transaction confirmation number is communicated to the merchant 14 by the merchant side software for each transaction. A transaction may be a debit or a credit to the token 68 and represents a purchase or credit to the consumer 16.
      iii) a purchase request bundled with token id/PIN authentication: The consumer 16 enters his/her token id/PIN combination only after selecting a product or service to purchase from the merchant 14. The merchant side software authenticates the token id, forwards the purchase request with token id/PIN combination to the clearing server 12, and requests the token 68 and update key. The clearing server 12 then downloads the token 68 to the merchant side software on the merchant 14. The clearing server 12 may instead perform the transaction itself on the token 68, record the transaction and then send a transaction confirmation number to the merchant side software on the merchant 14. This provides security when the transaction amount is large and may also reduce network overhead for a one-time transaction between the consumer 16 and the merchant 14.
      iv) a purchase request to be completed at a specified time in future. The additional execution information is stored in the database records of the merchant side software, which goes through either of the purchase processes described in 4a i), 4a ii) or 4a iii) above, when the time arrives for the payment transaction to be performed.

b) Giving the token money balance (field 78) to the merchant 14 after each transaction for display to consumer 16 (FIG. 1).

Consumer Registration

Figure 4B:
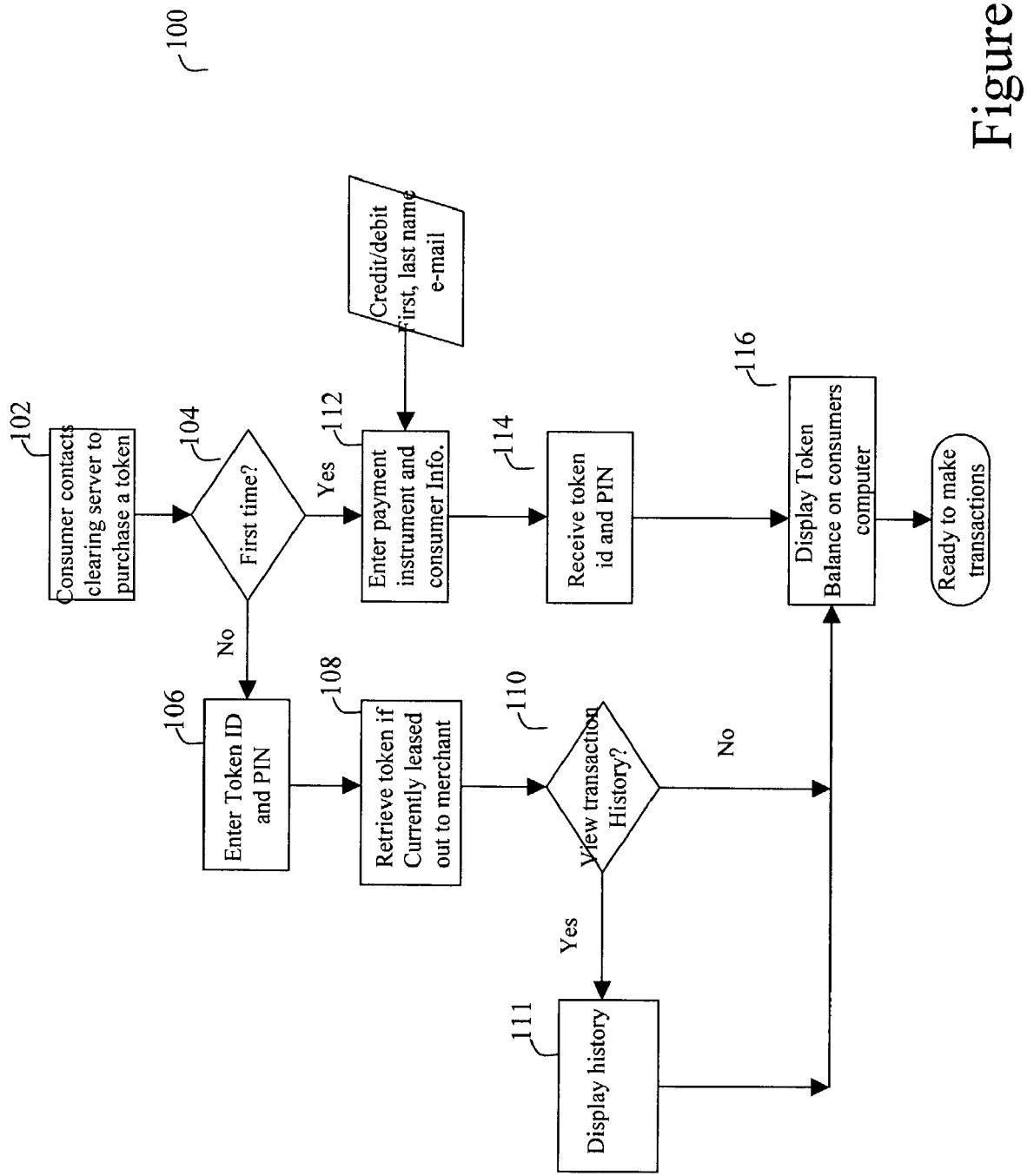
FIG. 4*b* is a flow diagram for registering and purchasing a token.

As shown in FIG. 4b, in the first step 102 of the registration process 100 the consumer 16 (FIG. 1) connects to the clearing server 12. In step 104 the clearing server determines if the consumer is a first time user. If so in step 112, the consumer is asked to enter a credit or debit or prepaid card and other personal information and to select the cash value of the token to be purchased. This amount can be fixed (e.g.$20) or be a fixed amount which is replenished it falls below a specified level. For example, a $50 token may replenished if its value falls below $10. Offline payments can also be used for which the prospective consumer obtains an anonymous prepaid card by mail. Such payments may be made with cash, check, or money order and may be accepted by mail or at manned and automated public kiosks, e.g., vending machines and ATMs, comprising computing devices 28 (FIG. 2) connected to the clearing server 12 via the network 10 (FIG. 1).

In step 114 the token 68 (FIG. 3) is created, the customer is given the token id and PIN number. All registration information is stored in the clearing server database 13 (FIG. 1). In step 104, it may be determined that the consumer 16 is already registered and already owns a token. The consumer 16 is prompted to enter the token id and PIN number. Following this, in step 108, the clearing server 12 then checks to see if the token is currently leased out to a merchant (i.e. if it is currently with a merchant to whom it was downloaded). If it is, the clearing server 12 polls the merchant, retrieves the token 68 with the transaction records, and updates its clearing server database 13. The transaction records are details of transactions conducted by the consumer 16 at the merchant 14 and comprise each transaction amount, a transaction authorization number; transaction id; date; time; merchant id; product id; and token id of transacting token. The clearing server 12 then prompts the consumer 16 to determine if he or she wishes to review the transaction history of the token 68. The transaction history comprises detailed records of all the purchase transactions performed with this token 68. It also comprises credits received, refills, money transfers made or received, cash drawn from the token, fees paid, interest earned, consumer information, and PIN entry failures.

If the consumer 16 does not want to review his or her transaction history, a display of the money balance of the token 68 is sent to the consumer 16 in step 116. If the consumer 16 wants to see the token 68 transaction records, the clearing server 12 proceeds to step 111, queries its database, and generates the transaction history for the token 68. After viewing the token 68 transaction history, the consumer 16 also obtains a display of the current money balance of the token 68 and is ready to transact. The consumer 16 who already owns a token 68 need not first connect to the clearing server 12 in order to begin performing transactions. The consumer can go directly to the merchant 14 to begin transacting.

Consumer Token Purchase and Creation

Figure 5:
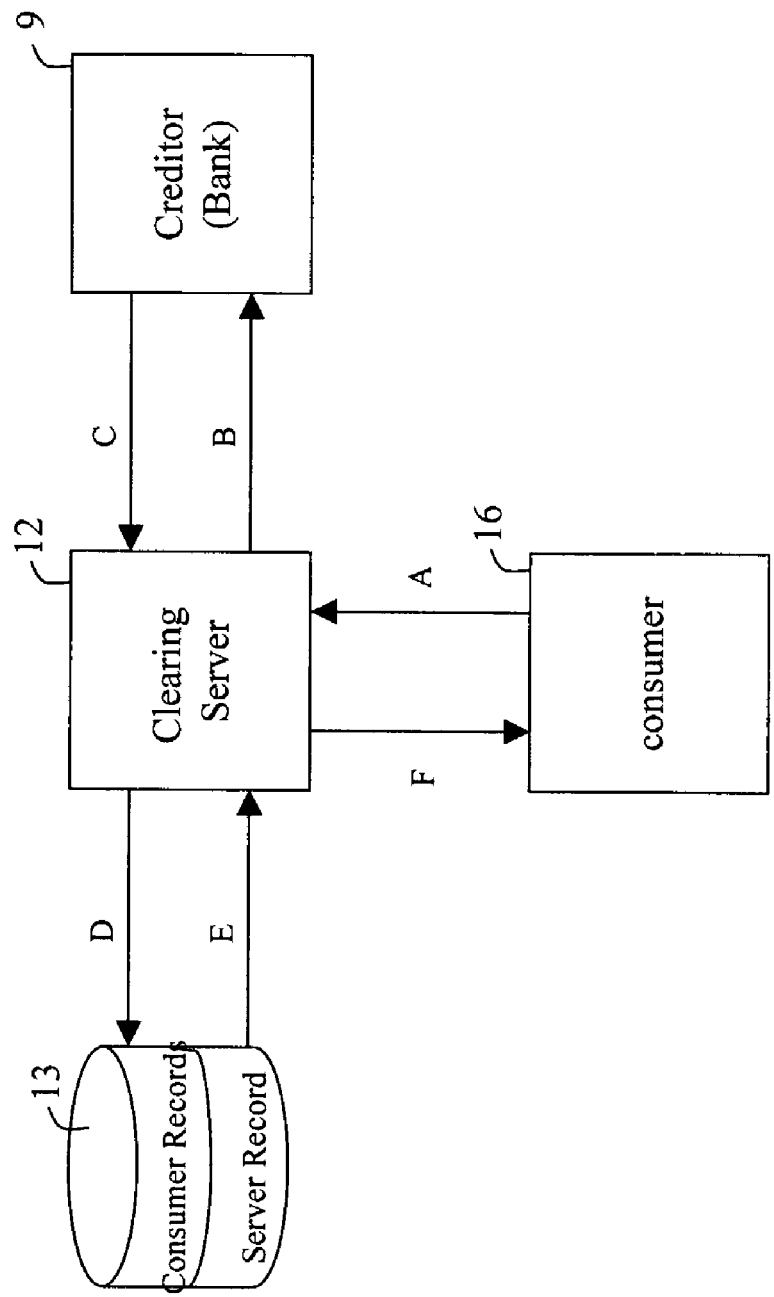
FIG. 5 is a diagram representing steps in acceptance of customer payments for tokens.

In one illustrative embodiment, the token creation step 114 (from FIG. 4b) is achieved as shown in FIG. 5 and described below:

A. The clearing server 12 receives a token-purchase request from the consumer 16 whose payment instrument was provided to the clearing server 12 in step 112 of the registration process 100 (FIG. 4b).

B. If the instrument is a credit card or a debit instrument, a creditor 9 (FIG. 5) who issued that instrument is contacted with the instrument details and the token purchase amount requested by the consumer. If the payment was made by check or money order, the clearing of the instrument might be slower. Alternatively, if the payment was made with cash, the clearing server 12 will not need to contact the creditor 9 (FIG. 5), and will proceed to step "D."Similarly, if an anonymous prepaid card issued by the clearing server 12 is used, contact with the creditor 9 is not necessary. In this situation, the consumer 16 enters the unique number of the anonymous prepaid card, which the clearing server 12 uses in querying its own clearing server database 13. The clearing server 12 retrieves the anonymous prepaid card record, generates a token 68 from the record, and provides the consumer 16 with a token id and PIN number with which to use the token 68.

C. The creditor 9 responds with a confirmation that the instrument has been debited.

D. The clearing server 12 executes a "create token" query on the clearing server database 13 which outputs fields used to generate token data, including the token id and money balance of the token 68 (FIG. 3). The clearing server 12 encrypts some of the fields from the query output; appends its signature and encryption key code; appends the current time and date; and then generates, encrypts and appends a hash value on the query output. The result is the token 68 with the fields described in FIG. 3.

E. This token 68 (FIG. 3) is stored as a record in the clearing server database 13.

F. The token reference number is generated, is split into a token id and PIN and sent to the consumer 16.

G. The token 68 is ready to be downloaded to the merchant 14 for use in commercial transactions.

H. Once the token 68 (FIG. 3) is purchased, the clearing server 12 displays the token money balance to the consumer 16. This display is subsequently updated by the merchant 14 after each transaction. The consumer 16 therefore sees a real-time display of the money balance of the token 68 with each transaction.

Transaction Operations

Figure 6:
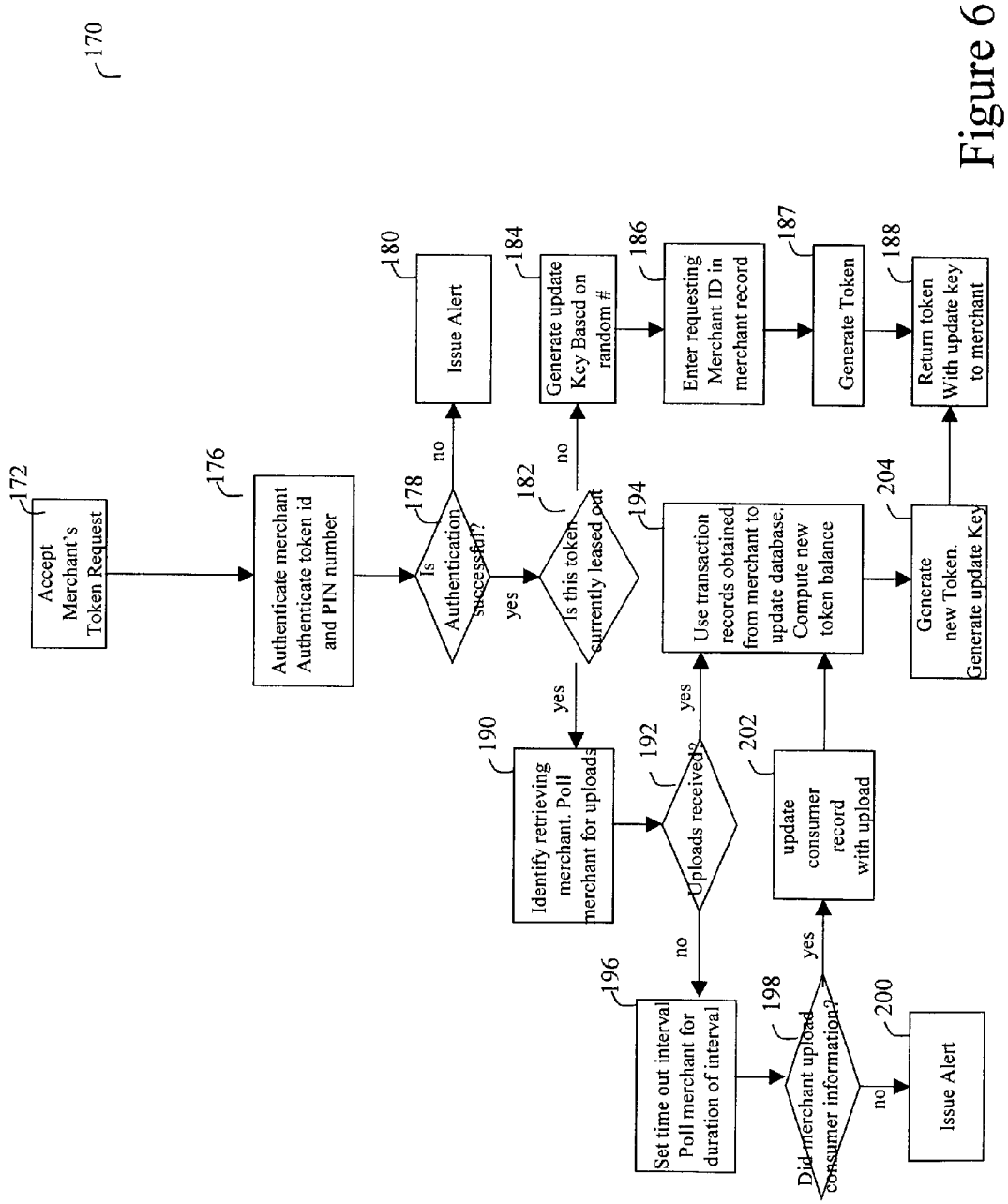
FIG. 6 is a diagram representing sequential flow of steps in performance of a transaction according to the invention.
Figure 7:
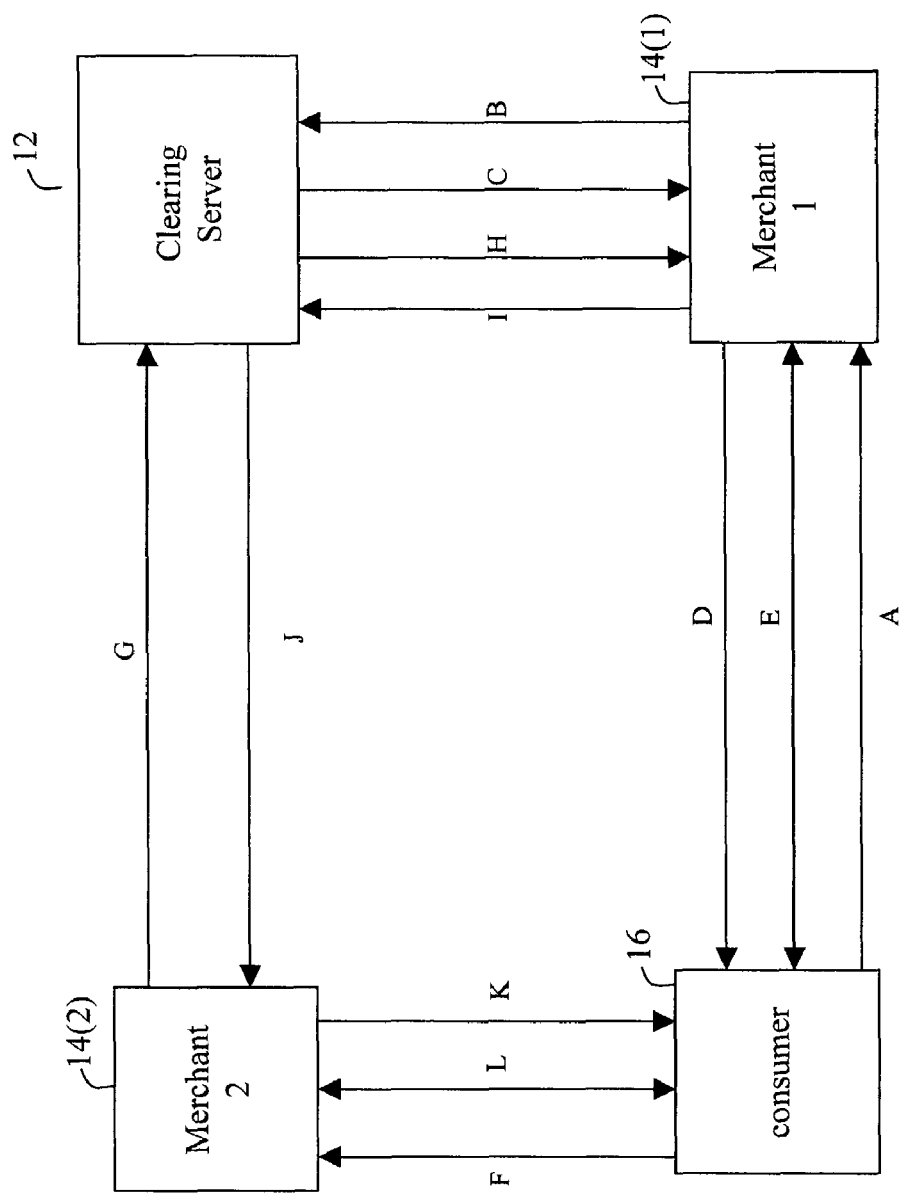
FIG. 7 is a diagram representing sequential flow of steps in performance of transactions between a consumer and two merchants

FIG. 7 illustrates how a consumer 16 who already owns a token performs transactions with multiple merchants while FIG. 6 shows the process by which the clearing server 12 generates and downloads the token 68 to the merchant.

In FIG. 7, the transactions steps are:

A. The consumer 16 connects to a first merchant 14 (1) to perform a transaction. This could be a debit transaction such as purchasing an item or a credit transaction such as obtaining a refund. "Item" is a generic description of any product or service and may include intangible services, cash, financial instruments, subscriptions, or a contract. The consumer selects an item to purchase and then enters his/her token id and PIN number.

B. This merchant 14(1) contacts the clearing server 12 with a request to get the token 68 associated with the token id and PIN number entered by the consumer 16. The merchant side software has a list of clearing server 12 addresses contacted in order of decreasing proximity to the merchant.

C. The clearing server 12 authenticates the merchant 14; authenticates the token id/PIN number; generates a new token with a new update key; and downloads it to the merchant 14(1). It is assumed for this illustration that this is the first transaction the consumer 16 is performing since purchasing the token 68.

D. The merchant side software on the merchant 14 decrements the token for the amount of the item purchased and provides the token 68 balance to the merchant 14 for download to the consumer 16. The merchant 14 releases the item to the consumer 16 along with the current money balance of his or her token 68.

E. Once the token 68 is downloaded to the merchant 14(1), the consumer 16 may perform very many transactions and get very rapid responses since the token 68 is decremented or incremented on the merchant 14(1) for each transaction with no network overhead; Authentication is required only once from the clearing server 12. After each transaction, the merchant side software decrements the token, writes the transaction details to the merchant database 15 and then gives the merchant 14 a transaction confirmation number along with the new money balance. The merchant 14 releases the purchased item to the consumer 16 and sends him or her the token money balance. The consumer 16 sees the token money balance display change in real-time with each transaction. Transaction details written to the merchant database 15 comprise a transaction amount; an authorization number; transaction id; date; time; merchant id; product id; token id of transacting token. Instead of being downloaded, the item may be sent to the consumer 16 via a different medium, delivered physically, or delivered at an agreed upon time in future. The item may also represent a service already performed for which no delivery is needed, or it may represent a payment for which no consideration is required (e.g. a donation). If the token money balance is insufficient for the payment transaction, the consumer 16 is notified and the transaction is terminated.

F. The consumer connects to a second merchant 14(2), selects an item for purchase, and enters his/her token id and PIN number G. The merchant 14(2) makes a request for the token 68 and update key from the clearing server 12.

H. The clearing server 12 polls merchant 14(1) (the first merchant) for the token 68 and all its transaction. The merchant 14(1) periodically uploads tokens 68 and token transaction records to the clearing server 12. If the token is not leased out, it means that such uploads have been received and the merchant 14 does not have to be polled. If the token 68 is leased out and polling fails to produce uploads, perhaps because the computing device of the merchant 14 is down or disconnected from the network 10 (FIG. 1), then token 68 (FIG. 3) is not downloaded to merchant 14(2). A timeout interval is set while merchant 14(1) is polled continuously. If no uploads are received from merchant 14(1) after this interval, the token is released to merchant 14(2) and any credits made to the merchant 14(1) may be temporarily or permanently ignored. However to avoid financial losses due to computer failures, mechanisms are available for communicating saved transaction data to the clearing server 12 via alternative data paths, e.g., point to point connections and modem dialup.

I. The merchant 14(1) uploads the token 68 and transaction records to the clearing server 12.

J. The clearing server 12 updates the clearing server database 13 with the records of all the transactions performed by consumer 16, generates a new token with the new money balance, creates an update key, and downloads both the token 68 and the update key to merchant 14(2).

K. The merchant side software on merchant 14(2) decrements the token and then the merchant 14(2) downloads the purchased item to the consumer 16 along with the new token money balance.

L. Once the token is downloaded to the merchant 14(2), the consumer 16 may perform very many transactions as in "E" above and get very rapid responses since all transaction confirmation is done locally on merchant 14 and no additional contact is required with the clearing server 12.

If the consumer 16 has a spending limit for merchant 14(1) then step "C" above would be for a token 68 with a money value equal to the spending limit of consumer 16 at merchant 14(1). Step "H" will be absent as the clearing server will not try to retrieve the token from merchant 14(1) when it gets a request from merchant 14(2). Instead it will create another token 68 for merchant 14(2) using the money balance remaining on the token 68 as shown on its clearing server database 13. In this situation steps "K" and "E" above representing continuing transactions between the consumer 16 and merchant 14(2), and between consumer 16 and merchant 14(1) can occur simultaneously.

FIG. 6 illustrates the steps taken by the clearing server 12 when it receives a token request from a merchant 14(2) as occurs in step "G" above.

The clearing server 12 on receiving the token request in step 172 (FIG. 6), attempts to authenticate the merchant 14 in step 176. It checks the merchant id and source IP address against information in its clearing server database 13. It may perform authentication on initial contact by encrypting information and passing it to the merchant 14 to be decrypted by the merchant 14 and returned to the clearing server 12. If authentication fails it issues an alert. If authentication is successful, the clearing server then authenticates the token id/PIN number combination received and identifies the token 68 associated with those numbers. The clearing server 12 then checks its clearing server database 13 to see if the token 68 is leased out in step 182. If it is not leased out, the clearing server 12 moves to step 184, generates a random number, which it uses to create an update key. It generates the token 68 in step 187 and writes the random number, token id, token money value, time, date, clearing server signature, encryption key code, requesting merchant ID and other encrypted fields onto the token. It then downloads the token with the update key to the requesting merchant 14(1). It updates the clearing server database 13 with all the fields on the token including the merchant id of the merchant 14(1) to whom the token is currently leased, the time and date of the lease, and the random number on the token.

If in step 182, the token had been leased out as would have happened when a request came from merchant 14(2) in the illustration above in step "G" (FIG. 7). The clearing server 12 would know this from checking its clearing server database 13 records. It would poll the merchant 14(1) indicated as currently leasing the token 68 and recall the token 68 with its transaction records. If no response is received to the poll from merchant 14(1), a time out interval is set and the merchant is polled continuously for the timeout period in step 196. If no uploads are received at the end of the time out period, an alert is issued and the token 68 is not downloaded to merchant 14(2). Additional efforts are made to contact the merchant 14(1) through alternative channels, and if no uploads are received, a token 68 is generated with an update key and downloaded to merchant 14(2). All the transactions from merchant 14(1) are permanently ignored. When the token 68 and updates are received. The clearing server 12 performs the following authentication steps:

a) Checks the token 68 to ensure that it was the same token sent to the merchant 14(1). The date/time on the token 68 should agree with the date time of the lease on the clearing server database 13.

b) Checks that the token has not expired; The time interval between leasing the token 68 and recalling it should not exceed the set "life" of the token. (e.g., If the elapsed time is 8 hours and the token has a life of 4 hours, then the token has expired).

c) Checks that field 78 was modified by the merchant 14(1) using the update key and now holds the current money balance of the token 68.

d) Checks that the new hash value of the token 68 is correct. The hash value is computed, encrypted and written into field 86 by the merchant 14(1).

e) Decrypts field 82 and deducts the value of field 78 from it. The result should equal the cumulative cash total of transactions conducted at merchant 14(1); It should therefore match the result obtained from adding up the individual transaction amounts in the transaction records uploaded from the merchant 14 for that token 68.

If the token 68 received is authenticated, the transaction records uploaded from merchant 14(1) are applied to the clearing server database 13 in step 194. A random number is generated and used to create an update key. A new token 68 is generated in step 204 and then both token and update key are downloaded to the merchant 14(2). The amount of authentication performed by the clearing server 12 may be reduced if communication is via a secure channel or when communicating with a trusted merchant 14.

Operation Recapitulation

To recap the workings of this invention:

1. The consumer 16 connects to a website managed or controlled by the merchant 14 and selects goods or services to purchase at a stated price and then enters his token id and PIN number.
2. The merchant 14 contacts the clearing server 12, submits the token id and PIN number received and requests the token 68 (FIG. 3) with an update key. The update key is used to modify the money balance field on the token. The initial amount of the transaction may be included in the request to the clearing sever 12. The clearing server 12 may do either of the following:

a) Generate a token and an update key and download it to the merchant 14.

b) Perform the transaction on the token in its clearing server database 13 and send transaction confirmation to the merchant 14 along with the new token balance, without downloading a token to the merchant 14. The merchant 14 receives the confirmation, releases the product and sends the money balance of the token to the consumer 16.

c) Send an "insufficient funds" message along with the token balance to the merchant 14 without downloading the token 68, if the initial transaction amount exceeds the amount on the token 68. The merchant 14 sends the "insufficient funds" message with the money balance on the token 68 to the consumer 16. It may also respond to a request from the merchant 14 for confirmation that the token's money balance exceeds a given amount.

3. If merchant 14 receives the token 68 from the clearing server, it authenticates it using any or all of the fields on the token. It may decrypt the clearing server signature, or decrypt the hash number of the token, run the token 68 fields through the hash algorithm and compare its results with the decrypted hash number for a match. If the token is authentic, the merchant side software reads field 78 on the token 68 for the token's money balance. After each transaction, it subtracts the transaction amount from the money balance of the token 68; writes this new money balance to field 78; generates a transaction confirmation number; and writes the transaction amount and transaction details into a record in the merchant database 15. Each new token money balance is sent to the consumer 16 by the merchant 14 and the product purchased is released.

4. The consumer 16 can continue to perform transactions at the merchant 14 until the token 68 expires (as an illustration the token life could be 4 hours), or its money balance exhausted. The token 68 is modified locally for each transaction, the new token money balance is given to the merchant 14, sent to the consumer 16 and is displayed in real time.

Figure 2:
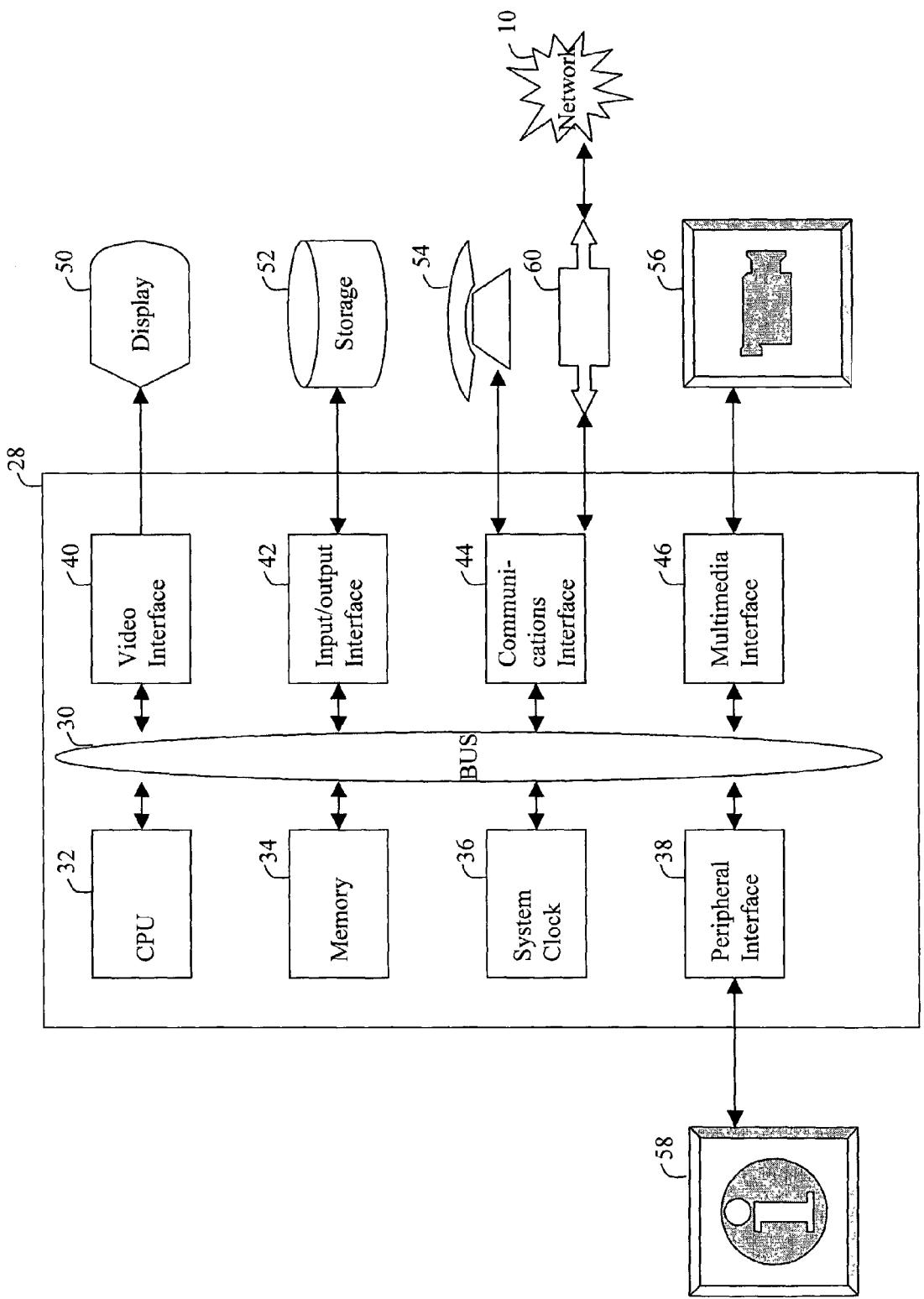
FIG. 2 is a diagram representing components of computing devices utilized for the present invention.

5. The consumer 16 connects to a second merchant 14(2) and enters his or her token id and PIN number at that merchant. The merchant 14(2) contacts the clearing server 12, submits the token id and PIN number received and requests the token 68 (FIG. 3) with an update key. The clearing server 12 then retrieves the token 68 with its transaction records from the first merchant 14(1). The token 68 with all its records is removed from the merchant 14(1) from the merchant database 15(1) and from its memory 34 (FIG. 2). This represents the end of the first transaction session. The clearing server 12 authenticates the token 68; updates its clearing server databases 13 with the transaction records from merchant 14(1); and then generates a new token with an update key which is downloaded to merchant 14(2).

6. The merchant 14(2) can now performs steps "3" and "4" above. The process can then be repeated indefinitely.

Additional Details and Embodiments

A. The consumer 16 uses any commonly available Internet browsing programs, to visit any participating merchant 14. The participating merchant must have registered with the client server 12 and installed the merchant side software as described above with reference to FIG. 4a.

B. Payments may be made for any range of items. The items may be purchased individually or several items may be grouped together then paid for at once. This is the shopping cart method commonly used at web sites. Alternatively, payments me be made for product or service subscriptions or may be conditional i.e. triggered by specified events, or may be an order to be executed at specified intervals or on specified dates. Some items or services purchased may be obtained or consumed immediately, (e.g., downloading digital files and spending time in a chat room.) Other items may be delivered in the future, (e.g., books) or consumed over time. For physical delivery of purchased items the consumer 16 may provide a destination address.

C. The transaction prices may be displayed by the merchants 14 next to each product. A description, small version, or a thumbnail of the product may be provided with its price. The consumer may negotiate the price with the merchant or accept it by clicking on the description or the thumbnail. For some transactions (e.g., cash withdrawals) the consumer 16 may select a price by entering it. The merchant 14 then adds any appropriate fees and then prompts the consumer 16 to confirm the total amount (i.e. price plus fee) to be debited from the token.

D. The invention is used to make payments for goods and services being sold on a network such as Internet. The payments may be performed by consumers 16 (FIG. 1) by establishing a path 11 (FIG. 1) to the merchant's website 14 (FIG. 1).

E. When the consumer 16 elects to make a purchase, the payment is made immediately, in real-time, and the token money balance visible to the consumer 16 is reduced by the amount of the purchase. The money balance may be increased if credit is given to the consumer 16.

F. The consumer can view the transaction history associated with a particular token by entering the token id and PIN number on the clearing server. The history includes the amounts spent, amounts received and the URLS (Uniform Resource Locators) of the merchants 14 where the token 68 was used.

G. Encryption, hashing, random number generation and other processes that occur either on the clearing server 12 or the merchant 14 may use commonly available algorithms, processes and software packages.

H. A warning is displayed when the token id/PIN number combination is entered incorrectly. A token 68 may be locked after several wrong PIN numbers are presented by the merchant 14 to the clearing server. The locking of the token 68 halts all operations for a time. A field in the clearing server database 13 is checked and a "locked" message is sent to the merchant 14 so that it does not request the token during the lock period. Other merchants who request the locked token also receive a locked message and do not receive the token. The duration of the lock is adjustable. The merchant 14 can also be locked after which no requests from that merchant to the clearing server 12 will be processed. The merchant 14 will be unable to get tokens from the clearing server 12.

I. The merchant side software can identify which token id's are authentic and can issue warnings without having to contact the clearing server 12. It has an algorithm for testing token ids and determining their authenticity.

J. To give credit to a consumer 16, the merchant 14 must have a credit line or credit balance at the clearing server. If not, any credit received can only be used by the consumer 16 at the merchant 14 for that transaction session. Once the session ends, and the clearing server 12 retrieves the token 68, the clearing server 12 attempts to debit the merchant's account at the clearing server 12 for the cumulative credits applied on the token. If the debit is successful, the credits are applied to the token 68 but if the debit fails, the credits applied to the token 68 by that merchant 14 are discarded. The debit to the merchant may take the form of a reduction in the merchant's account at the clearing server 12; a draw down of a credit line specified by merchant 14 at registration; or a debit of the merchant's account at a financial institution.

K. The authentication performed both by the clearing server 12 and the merchant 14 may be increased or decreased depending on security of the network and the amount of trust between both parties. For example, communication between a parent company and a subsidiary within a closed network may require no authentication in which case the token 68 need have only two fields: a token ID and a money value.

L. The merchant 14 may need to contact the clearing server 12, if a transaction or a series of transactions are interrupted (e.g., due to loss of power to the merchant 14). At this point, the clearing server 12 is unaware of how much the consumer 16 has spent at he merchant 14. It will only has the state of the token before it was downloaded to the merchant. Loss of transaction records at a merchant 14 will affect only that merchant 14. The merchant database 15 managed by the merchant side software is designed to avoid loss of transaction data by using transaction logging. It also performs frequent intermittent uploads of token 68 and token transaction records to the clearing server. Once an upload of a token is received, the clearing server 12 modifies its database to show that the token 68 is not leased out, so new token requests can be serviced without the need to request uploads.

M. The consumer 16 may shut off his computing device while transacting with a merchant 14. If the consumer 16 returns to the same merchant within the life of the token (e.g., 4 hours) and without first entering his or her token id and PIN number at another merchant, then his token 68 will still be with the first merchant 14 and the consumer can continue transacting with the merchant and will still obtain local and immediate confirmation for each transaction. Note that retrieval of the token 68 from the merchant is only performed if the consumer enters his token id/PIN number at another merchant. If the consumer 16 visits another merchant in this intervening period without entering his or her token id and PIN number and then returns to the first merchant 14, his or her token 68 will still reside with the first merchant 14. This assumes that the merchant 14 did not do an intermittent upload of the token 68 and its transaction records to the clearing server 12 during the period of consumer inactivity.

N. If the token 68 expires or the consumer 16 enters his or her token id/PIN number at another merchant 14(2), then the clearing server will retrieve the token 68 from the first merchant 14(1), modify it, and send it to the second merchant 14(2). If the consumer 16 now returns immediately to the first merchant 14(1), its token will no longer be there. The consumer must renter his token id/PIN number and the merchant 14(1) will then send a request for the token 68 to the clearing server 12 which then retrieves it from the second merchant 14(2), recreates it, and downloads it to the first merchant 14(1).

O. It should be noted that although the consumer and the merchant have been described as residing on separate computing devices, both may be co-resident on the same computing device. Such a configuration may allow different entities, e.g., merchant and consumer, to perform as both, the merchant and as the consumer. Additionally, the clearing server 12 may reside on a merchant 14. This configuration may significantly reduce networking traffic overhead for a high volume merchant 14. Any transaction that can be performed on a merchant 14 can also be performed by the clearing server 12, although the reverse is not true. This means the clearing server can disburse cash, sell goods, offer credits, perform money transfers etc.

P. The clearing server 12 does not have to reside on a single computing device but may reside on multiple computing devices across a local area network (LAN) or wide area network (WAN). Such multiple clearing servers 12 on a LAN or WAN are hereinafter referred to as a cluster and each clearing server 12 within the cluster is referred to as a member of the cluster. All clearing servers 12 in a cluster may have identical clearing server databases 13 which allows any request for a token 68 received by any clearing server 12 in the cluster to be serviced by that clearing server. However synchronizing identical databases while workable on a LAN creates significant overhead across a WAN. The invention uses two methods to eliminate the need for each member of a cluster to have the same clearing server database 13. This requires that the clearing servers 12 be able to communicate with each other on a network and that their respective clearing server databases hold unique records (i.e. a token id or prepaid card number does not exist on more than one clearing server database). The methods used in this embodiment are:

a) A clearing server 12 forwards token id/PIN requests or anonymous prepaid card numbers it receives to other clearing servers 12, whenever such requests cannot be serviced from its own clearing server database 13. Each such request is forwarded from one member of the cluster to the other until either the associated token 68 or pre-created record is found, or each member of the cluster has received and failed to service the request. The invention requires that every token id number and every anonymous prepaid card number be unique within the cluster. If a token id record is found on the clearing server database 13 of a member of the cluster, that member may
   i. generate and download the token 68 directly to the merchant 14. It will write its IP address into field 92 on the token so that uploads will be sent by the merchant 14 to that particular clearing server 12.
   ii. transfer the token record to a clearing server cluster member nearest to the requesting merchant 14. In the latter case, on confirming receipt of the token 68 records, the originating clearing server 12 deletes the token 68 record from its clearing server database 13. The receiving clearing server 12, inserts the token record into its clearing server database 13; generates the token and writes its own database alias and IP address into field 72 and field 92 on the token. The database alias allows any clearing server 12 receiving an upload of a token and its transaction records to identify the clearing database 13 where the token records reside. The clearing server IP address allows a merchant 14 to upload the token 68 and transaction records back to the clearing server 12 from whom it was received.

b) If a clearing server cluster has very many members, each member of the cluster generates the token id/PIN number and anonymous prepaid card number in a way that uniquely identifies the number as originating from that member of the cluster. Several possible schemes can be used including giving each cluster a number range or a number set from which token id/PIN numbers are generated; specifying that certain fixed positions on the token id/PIN numbers be used for identifying cluster members. For example, the first two numbers of a token id/PIN may identify the cluster member. The identification method allows any clearing server 12 cluster member to immediately forward a token id/PIN request to the originating clearing server 12 (i.e., the clearing server 12 which created the token 68). With this method, if a merchant requested token record is found on the clearing server database 13 of a member of the cluster, that member may do one either of the following:
   i. generate and download the token directly to the merchant 14 or
   ii. transfer the token record to the member of the cluster nearest to the requesting merchant 14. In the latter case, on confirming receipt of the token 68 records, the originating clearing server 12 inactivates the token 68 record in its clearing server database 13 and makes an entry that points to the "foster" clearing server 12 that now holds the token record. Any subsequent requests for that token are directed by the originating clearing server to the foster clearing server 12 which now holds the token record. The foster clearing server 12 will service all merchant requests for that token and will apply uploads to the token records on its clearing server database. These requests will be directed to it by the originating clearing server.
   iii. Eventually the originating clearing server may request that the token records be returned: This could occur if it begins to receive frequent requests for that token from within, or close to its DNS (Domain Name System) domain. The foster clearing server responds by copying the record for the token back to the originating clearing server 12 and then deleting that token record from its own clearing server database 13. The originating clearing server 12 overwrites the old token record with the new one, removes the pointer to the foster clearing server 12, and reactivates the token record. In this embodiment, no token request requires more than three "hops" to service, where the number of hops equals the number of clearing servers 12 in the path to be traversed to reach the clearing server 12 with the token record. Also if the foster clearing server retains the token record for a lengthy period, it will generate its own token id/PIN number for the consumer and request that the customer discard the token id/PIN of the originating clearing server.

Support for distributed independent clearing servers 12 means that clearing server functions can be licensed to multiple parties. It also means clearing servers 12 can be established across very broad regions.

Cash Disbursements

FIG. 8 is a flow chart which illustrates how cash disbursement is performed using the invention. In step 300, the consumer 16 (FIG. 1) enters his or her token id/PIN number at the merchant 14. The merchant 14 forwards the token id/PIN request to the clearing server 12. The clearing server 12 generates a token 68 and update key which is downloaded to the merchant 14 in step 302. In step 304, the consumer selects (i.e. enters) the amount of cash to be purchased from a menu on merchant 14. The cash "purchase" is a withdrawal, as the merchant is "selling" cash. In step 306, the merchant 14 displays the cash withdrawal amount plus any fees. The consumer 16 confirms the total withdrawal amount in step 308. In step 310, the merchant 14 decrements the token for the total amount using the update key; records the transaction in the merchant database 15; and then disburses the total cash less any fees to the consumer 16. The invention is used to disburse cash by viewing cash as a product purchased by the consumer.

The cash-disbursing merchant 14 may need to provide additional information during registration to satisfy any requirements of law. A cash-disbursing merchant 14 may be a bank or financial institution. This would mean that the consumer 16 cash withdrawals from such entities do not need to use the private networks and proprietary protocols currently used for money transfers and cash disbursements by entities such as Automatic Clearing House (ACH), NYCE, STAR, MAC. Using the invention, a machine that disburses cash, such as an Automatic Teller Machine (ATM) that has an Internet connection, is registered with the clearing server, loaded with merchant side software, with an appropriate interface (e.g., keypad and monitor), and having cash, becomes an ATM merchant 14 or a cash-disbursing merchant 14.

Redemptions of Tokens for Cash

The token 68 (FIG. 3) can be redeemed for cash as indicated above using a cash-disbursing merchant. The consumer

16 (FIG. 1) may also choose to receive all or a portion of the token as check. The consumer 16 connects to a check-cutting merchant 14 and enters his token id/PIN number. The check-cutting merchant 14 retrieves the token 68 and update key from the clearing server and then prompts the consumer 16 to confirm the check amount plus any fees. Once the consumer confirms the amount, the check-cutting merchant 14 prompts the consumer 16 to provide the name and address of the check beneficiary. The check-cutting merchant 14 then debits the token 68, records the transaction in its merchant database 15 and then cuts a check for the total amount less any fees, and mails it to the name and address specified by the consumer 16.

Money Transfers

Figure 9:
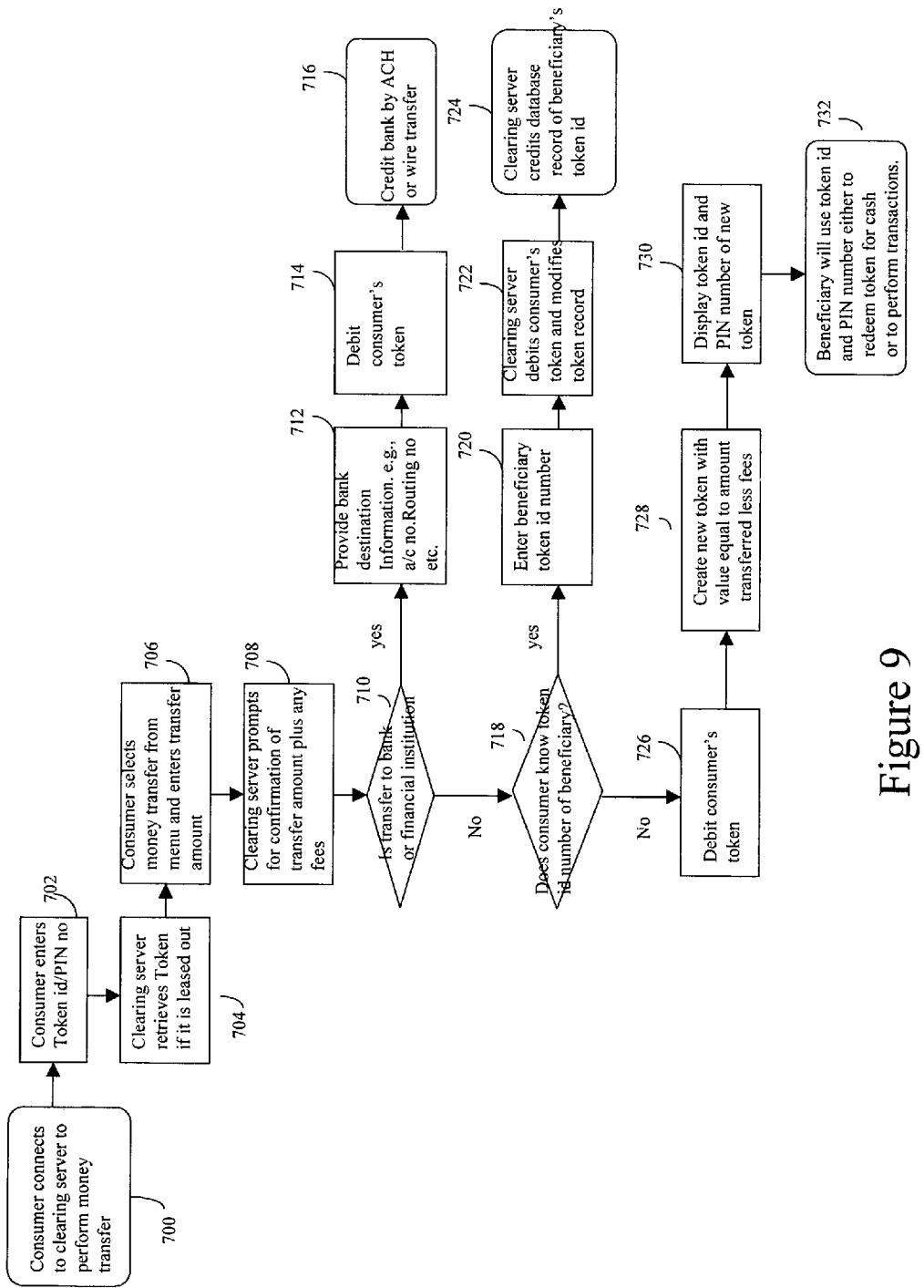
FIG. 9 is a diagram representing steps in performing money transfers from a token.

The invention is also used to perform money transfers between any two entities as illustrated in FIG. 9. One entity will function as the consumer 16 (FIG. 1). The money transfers may be from a a) Token to a bank (where bank may be any financial or credit institution). The consumer provides the bank destination information such as the account number, bank routing number etc. The token is debited by the clearing server 12 for the transfer amount and then funds equal to transfer amount are sent to the specified bank by ACH or wire transfer. Where the financial institution is registered with the clearing server as a merchant 14, the transfer amount can be credited directly to the record of the bank or financial institution in the clearing server database 13. If the bank or financial institution has a token, the transfer becomes a token-to-token transfer described below in "b".

b) Token to another token. The consumer 16 provides the token id number of the destination token. The clearing server debits the consumer's 16 token 68 and credits the token record associated with the token id of the recipient. A PIN number is not required to apply a credit to a token, though the credit applied needs to be verified as backed by cash. All tokens are backed by cash.

c) Token to a new token. The consumer requests a transfer without naming a recipient token id. A new token is generated by the clearing server 12, and the consumer 16 is given the token id and PIN number of the new token. The consumer 16 communicates the token id/PIN number to the money transfer recipient. The recipient can then use the token id/PIN number, from any computing device on the Internet, to convert the token to a check or cash; to transfer the token money balance to a bank account; or to perform transactions. For transfers exceeding specified minimums the consumer 16 may be required to provide verifiable personal information on the money transfer recipient e.g. Name, address, birth date, social security number, email address, password etc. These pieces of information will then be required in addition to the token id/PIN number to access the token.

The money transfer steps are shown in FIG. 9. In steps 700, 702 and 704, the consumer 16 connects the clearing server 12 and enters his or her token id/PIN number following which the clearing server retrieves the token 68 if it is leased out. In step 706, the consumer 16 selects a money transfer menu and enters the amount to transfer. In step 708, the clearing server 12 prompts the consumer 16 to confirm the transfer amount plus any applicable fees. In steps 710 and 718, the clearing server 12 prompts the consumer to determine the destination of the money to be transferred. If the destination is a bank or financial institution, then in step 712 the consumer 16 provides the bank routing number, the bank account etc. and in step 714 the clearing server debits the consumer's token 68.

The transfer amount is then sent to the bank by conventional methods such as by wire or Automatic Clearing House (ACH) Transfer in step 716.

If the bank is a registered merchant 14 (FIG. 1), or has a token 68, then the money transfer is completed by crediting the bank's merchant 14 record or token 68 record in the clearing server database 13. For credits to the token record the bank's token id has to be provided by the customer 16.

If the transfer destination is another token 68(2), then this is a token-to-token money transfer. The consumer provides the recipient token id in step 720. The clearing server 12 debits the consumer's token 68 in step 722 and then credits the token record associated with the token id of the recipient in step 724. The recipient's token may be leased out and so the transfer will only be applied to his token 68 when it is recalled by the clearing server 12. The consumer 16 performing the transfer may specify immediate commitment of the transferred funds to the recipient's token 68. In that case the clearing server 12 will recall the recipient's token, if it is leased out, and update the token 68 and its records with the transferred funds.

If the consumer 16 specifies neither a bank/financial institution nor another token id, then the transfer defaults to a token-to-new token money transfer. In this case, the clearing server 12, debits the token 68 of the consumer 16 in step 726. It then generates a new token with a money balance equal to the amount of the transfer less any fees in step 728. In step 730, it forwards the token id/PIN number of this new token 68 to the consumer 16 who then communicates it to the recipient. The money transfer recipient uses token id/PIN number either to redeem the token 68 immediately for cash or check; or to transfer the token money balance to a bank Both options are described above under the headers "Cash Disbursements" and "Redemptions of Tokens for Cash". The recipient may also choose to use the token for transactions and may specify a credit card, debit card or bank account with which to refill the token 68. A token generated by a money transfer is identical to a token purchased by anonymous prepaid card.

Offline Transactions

Offline transactions are yet another embodiment of the invention wherein consumers are enabled to perform offline purchases. A Point Of Sale device (POS) e.g., a cash register, a vending machine, a magnetic card reader, can all be considered merchants 14 (FIG. 1). Each will need to be connected to the Internet, registered with the clearing server and loaded with merchant side software. Each device will have to provide an interface for entering a token id/PIN number, and selecting an item for purchase. Transactions can be performed with the aforementioned devices in the following ways:

1. For a POS, the consumer 16 enters a token id/PIN number into the POS which then goes through the process of retrieving the consumer's token from the clearing server and debiting it. This can be used to make payments at supermarkets, restaurants, gas stations, etc.
2. The token id number may be written onto a magnetic stripe on a physical card owned by the consumer. A card reader then reads the token id and prompts the consumer for the PIN number. The card reader via the Internet then retrieves the token 68 from the clearing server 12 and performs token 68 transactions as a merchant 14 as described above in the invention.
3. Vending machines registered as merchants 14 may require manual or wireless interfaces to permit the consumer to enter the token id/PIN number. The consumer may punch in the numbers on the key pad found on most vending machines or may use infrared transfers to enter the token id/PIN numbers from a handheld device, e.g., from a PDA to the vending machine. The vending machine can then retrieve the consumer's 16 token from the clearing server via the Internet and debit it for each consumer 16 purchase. This embodiment enables consumers 16 to purchase tickets, stamps, food, etc., from vending machine or similar devices. It may also be used to pay for traffic tolls. Cell phones may be used to enter token id/PIN numbers into sales devices with wireless interfaces and may also be used to pay toll fares.

Auctions

The invention is well suited to perform online auction payments. Auction winners may pay the vendor by performing a transfer of funds from their token to the vendors token. The transfer is immediate, the cost is very low, and the vendor incurs no cost of set up associated with accepting other forms of payment e.g. credit cards. The vendor needs to have a token and provide the token id to participating auction bidders. The auction vendor may also be a registered merchant 14 as described by the invention i.e., registered with clearing server, Internet connected, and enabled with merchant side software. The auction vendor merchant may choose to accept bids only from bidders who have tokens 68. The winning bidder will have his or her token downloaded and debited immediately, thus eliminating frivolous bids and winning bidders who have no intention of paying.

Cross Currency Transactions.

The invention allows consumers who have tokens with money value in one currency to make purchases in another currency. An exchange rate between both currencies is required. In this embodiment, the consumer may use either of two methods:

A. The consumer 16 converts the entire token, or a portion of it, from the first currency to a second currency, at a registered foreign-exchange (FX) merchant 14 (FIG. 1). The consumer can then make token 68 purchases in the second currency. The FX merchant 14 needs to have purchased a large value token, denominated in the second currency from the clearing server 12. For illustrative purposes, assume that the consumer's token 68 is denominated in dollars and the FX merchant 14 has a token denominated in pounds.
  i. The consumer connects to the FX merchant and enters a token id/PIN number. The FX merchant 14 retrieves the token 68 from the clearing server 12 and prompts the consumer 16 to select the amount of pounds to purchase.
  ii. The consumer 16 selects an amount in pounds and the FX merchant 14 then computes the cost of the pounds purchase in dollars plus fees. The consumer confirms the total purchase amount, which is denominated in dollars.
  iii. The FX merchant 14 prompts the consumer to provide the token id of a pound denominated token to which the purchased currency may be transferred. If the consumer provides a pound denominated token id, The FX merchant 14, debits the consumers token and then sends a request to the clearing server. The request includes the FX merchant's token id/PIN, the pound amount to transfer from his pound denominated token and the destination token id of the transfer. The clearing server debits the pound denominated token of the FX merchant and credits the specified token id. The transfer is immediately available to the consumer who can see the token money balance displayed and can make pound purchases.
  iv. If the consumer 16 does not have a pound denominated token, the FX merchant debits the token, and then performs a token-to-new token transfer as described above under the heading "Money transfers" (FIG. 9). The FX merchant 14 then provides the consumer with the token id and PIN number of the new pound denominated token 68. The consumer 16 may instead specify a bank where the pounds are to be wired or may choose to pick up the foreign currency as travelers checks at a specified location.
  v. The consumer uses this token id/PIN number to perform transactions with merchants 14 selling items priced in pounds.
  vi. This embodiment when used for large sums is suited for foreign exchange trading and significantly reduces back office overhead. An FX merchant 14 lists cross currency exchange rates that constantly change. The consumer 16 enters a desired volume to purchase at a particular rate. On selecting or entering the desired volume, the amount to be paid in the consumer's 16 token currency plus fees is displayed. If this amount is confirmed by the consumer the transaction is completed with the usual process of debiting the consumer's token. Delivery of the purchases currency will take place three days later at the bank destination specified by the consumer. For large transactions, the token may be backed by credit lines and not cash. Details for each transaction are stored and can be viewed by both the consumer 16 and the merchant 14 on the clearing server. As mentioned above any transaction that can be performed at a merchant can also be performed at the clearing server.

B. The consumer may make prefer to perform currency conversions per purchase transaction. In this case, the item priced in foreign currency is first converted to the consumer's token currency before the purchase is confirmed. For example a consumer 16 (FIG. 1), with a dollar denominated token 68 may select a Euro priced item from a foreign merchant 14 website (FIG. 1). At the time that the consumer is asked to confirm the purchase, the price of the item is converted to the currency of the token at the going exchange rate. The exchange rate, which may include a premium, will be obtained from accepted sources of exchange rates such as a bank. On consumer confirmation, the consumer's token is debited for the converted dollar equivalent amount of the purchase. The foreign merchant 14 however takes a risk as exchange movements may make the dollar revenue received less than the Euro denominated price for which the item was sold.

Promotions

The invention enables online merchants 14 to provide refunds and promotional credits to some consumers 16, all consumers 16 or just to consumers 16 who request it. Credits and refunds may be applied to tokens 68 following purchase returns; or to compensate consumers for defective products; or to encourage consumers 16 to shop at the merchant's 14 website. The merchant 14 may give a refund by transferring funds directly to the consumers token once given the token id. The merchant may also give the consumer 16 credit while the consumer 16 is performing transactions at the merchant. In disputed transactions, the consumer may have to provide the merchant with details of the transaction. These can be obtained from the token transaction history.

If the credit should only be applied once to each token, then the merchant side software prevents consumers from obtaining multiple credits to their tokens. To do this, the merchant side software is given the transaction id associated with the promotion. Before it uploads the transaction records to the clearing server, it deletes all but one of the rows that hold that transaction id. This way all but one credit is eliminated. The clearing server may also perform identical deletions for a period specified by the merchant 14. For example if the promotion is for one token for the month of September, then on the clearing server database the clearing server deletes all multiple occurrences of the promotion transaction id in its transaction tables for each token for the month of September. In this case, however, a consumer with multiple tokens will get the promotional credit for each token.

Merchant promotions may be based on the demographic profile of the consumer e.g., age, sex, zip code. This information is stored in the clearing server database records. Queries can be generated that identify tokens owned by consumers that match the desired profile. Credits can then be applied direct to those tokens and then other information, such as the issuing merchant URL, can be included in the token transaction history.

Using the invention, merchants are able to give promotions usable only with the issuing merchant. Promotional credits are identified by a transaction id when they are recorded by the merchant side software on the merchant's database 15. For merchant specific promotions, before any token is uploaded to the clearing server, all occurrences of the promotional transaction id in transaction records are deleted from the merchant database.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A method of performing at least one transaction between a consumer and a merchant the merchant presenting a plurality of products on at least one computing device connected to a network, said plurality of products including at least one of good and services having prices, the transaction having an offer by the merchant to sell and a bid by the consumer to purchase at least one product of said plurality of products, said method comprising the steps of:
   receiving by the merchant the bid to purchase the at least one product, the at least one product being identified in the bid to purchase;
   sending to the merchant by said consumer an identification number associated with real money value stored within a token which is a digital representation of monies deposited residing on a clearing server;
   requesting a token or fractional token by the merchant from said clearing server, said token representing a real stored money value;
   requesting by the merchant from a clearing server an update key during a processing of the bid to authorize making changes to a value field of said token, said update key being unique for said token;
   receiving by the clearing server during the processing of the bid a transaction information upload on said clearing server from a previous merchant where said token was used last by polling the previous merchant to obtain the transaction information, said transaction information including any changes to the value field of said token; and processing the bid by the merchant; and
   making monetary value changes on said consumer's token by said merchant utilizing said key from the clearing server.

2. The method of claim 1 further comprising the steps of: providing a payment of a token purchase price; said token purchase price being the real stored money value of said token, and creating and storing said token on a clearing server, the value of said token purchase price being entered into said value field, said clearing server comprising at least one computing device connected to the network.

3. The method of claim 2, further comprising a step of providing personal information regarding the consumer and financial information regarding a payment instrument to be used for providing said payment of said token purchase price.

4. The method of claim 3, further providing said payment of said token purchase price with a credit card.

5. The method of claim 3, further providing said payment of said token purchase price with an anonymous token card.

6. The method of claim 1, wherein said step of receiving said bid to purchase the at least one product further includes the step of identifying a transferee, said transferee being the beneficiary of a money transfer transaction.

7. The method of claim 6, further comprising the step of generating a unique transferee identifier.

8. The method of claim 1, wherein said step of receiving said bid to purchase the at least one product further includes the step of identifying a refund transaction, said refund transaction distinguishing said product for which a money refund is requested.

9. The method of claim 1, wherein said step of receiving said bid to purchase the at least one product further includes the step of identifying a credit transaction, said credit transaction identifying said credit offered by the merchant.

10. The method of claim 1, wherein said step of receiving said bid to purchase the at least one product further includes the step of specifying a bid price, said bid price being different from the prices of the at least one product.

11. The method of claim 10, wherein said step of specifying said bid price further specifies a time range for completing the transaction.

12. The method of claim 1, wherein the step of requesting said update key further comprising a step of requesting said token from said at least one clearing server.

13. The method of claim 6, wherein the step of requesting said update key further comprising a step of receiving information identifying said transferee.

14. The method of claim 1, wherein the step of receiving said information uploads from the merchant further comprising a step of destroying the token and the update key.

15. The method of claim 1, wherein said step of processing comprising steps of:
   (a) terminating the performance of the at least one transaction if said magnitude of said value field is less then the price of the at least one product included in said received bid;
   (b) updating said value field in accordance with said price of the product of the bid and said update key;
   (c) dispatching the at least one product to the consumer;
   (d) repeating steps (a) through (c) if a new bid to purchase the at least one product is received; and
   (e) uploading transaction information to said clearing server.

16. The method of claim 15, wherein said step of updating further comprising the step of: verifying that said update key matches a key embedded in said token; and terminating the performance of the at least one transaction if said update key does not match said key embedded in said token.

17. The method of claim 15, wherein said step of dispatching the at least one product to the consumer is transferring cash to the consumer, the at least one product being cash.

18. The method of claim 15, wherein said step (c) further comprising the step of displaying said value field of said token on a computing device used by the consumer.

19. A method of performing at least one transaction between a consumer and a merchant the merchant presenting a plurality of products on at least one computing device connected to a network, said plurality of products including at least one of a good and service having a price, the transaction having an offer to sell by the merchant and a bid by the consumer to purchase at least one product of said plurality of products, said method comprising the steps of:
   receiving by the merchant the bid to purchase the at least one product, the at least one product being identified in the bid to purchase;
   sending to the merchant by said consumer an identification number associated with real money value stored within a token which is a digital representation of monies deposited residing on a clearing server;
   requesting by the merchant from a clearing server an update key to authorize making changes to a value field of a token, said update key being unique for each transaction;
   making monetary value changes on said consumer's token by said merchant utilizing said key from the clearing server;
   receiving by the clearing server, after the update key is requested, a transaction information upload from a previous merchant where the token was used last by polling the previous merchant to obtain the transaction information, the transaction information including a change to the value field of the token; and
   updating by the clearing server said value field in accordance with said price of the product of the bid and said update key; and waiting by the merchant to receive a new bid to purchase the at least one product.

20. The method of claim 19, further comprising the steps of; dispatching the at least one product to the consumer; uploading transaction information to said clearing server; and displaying said value field of said token on a computing device used by the consumer.

21. A method of performing at least one transaction between a consumer and a merchant the consumer and the merchant utilizing at least one computing device, the at least one computing device being connected to a network, said method comprising the steps of:
   communicating by the consumer to the merchant a request for a purchase said request including at least one item from a plurality of goods and services, said plurality of goods and services including associated prices being shown on the computing device utilized by the merchant;
   sending to the merchant by said consumer an identification number associated with real money value stored within a token which is a digital representation of monies deposited, residing on a clearing server;
   requesting by the merchant from a clearing server an update key, said update key being used as an authorization to modify a value of a token;
   making monetary value changes on said consumer's token by said merchant utilizing said key from the clearing server;
   determining by the clearing server an amount paid by the consumer to a previous merchant by polling the previous merchant to obtain the amount paid to the previous merchant, and modifying the value of the token based on the obtained amount paid to the previous merchant; and
   providing by the clearing server to the merchant said update key and said token.

22. A method of performing a transaction between a consumer and a merchant, the consumer and the merchant utilizing computing devices connected to a network, the method comprising the steps of:
   funding a token which is a digital representation of monies deposited, by adding money value for an amount determined by said consumer, said token or fractional token residing on a preselected clearing server, and said consumer receiving an identification number corresponding to said token;
   communicating, during a financial transaction, by the consumer to the merchant a request to purchase from the merchant at least one of a good and service, the request including supplying by the consumer to the merchant an identification number corresponding to a real stored money value on said token;
   communicating, during the financial transaction, an authorization request by the merchant to a clearing server, the authorization request including the supplied identification number;
   receiving from the clearing server by the merchant a token associated with said consumer having real money value;
   receiving from the clearing server by the merchant a key for the merchant to have authorized access to change the monetary value of said token;
   making monetary value changes on said consumer's token by said merchant utilizing said key from the clearing server; and
   ascertaining, by the clearing server during the financial transaction, for the merchant an amount paid by the consumer to a previous merchant during a prior financial transaction by polling the previous merchant to obtain the amount paid to the previous merchant;
   modifying, by the clearing server during the financial transaction, the real stored money value of the token corresponding to the identification number received from the consumer said modification being based on the net amount debited or credited by the previous merchant to said token for transactions at said previous merchant; and
   authorizing the financial transaction by applying to the new stored money value of said token a debit or credit for the amount required in the financial transaction for the at least one of a good and service.

23. The method of claim 22, wherein the consumer has predetermined a spending limit for a first merchant, the method comprising creating a second token from the consumer's original token when the consumer transacts with the said first merchant, the said second token being a fractional token having a stored money value smaller than the stored money value of the original token corresponding to the identification number supplied by the consumer.

24. The method of claim 23, comprising the steps of:
   communicating, during a first financial transaction, by the consumer to the first merchant a request to purchase from the first merchant at least one of a good and service;
   communicating, during a second financial transaction, by the consumer to a second merchant a request to purchase from the second merchant at least one of a good and service, the request including supplying by the consumer to the second merchant an identification number;
   creating by the clearing server a third fractional token from said original token which is a digital representation of monies deposited, for the second merchant without polling the first merchant, the third token having a real stored money value representing a fraction of the remaining money value of the original token, each said created fractional token having the same token identification number;

repeating the steps of creating a fractional token from the original token for each of a plurality of merchants whereby each fractional token enables the consumer to perform simultaneous transactions with each of the plurality of merchants;

making monetary value changes on said consumer's fractional token by said merchant utilizing said key from the clearing server; and performing transactions with each of a plurality of merchants with fractional tokens whereby the money value of transactions performed with each merchant does not exceed the stored money value of the fractional token downloaded by the merchant from the clearing server.

25. The method of claim 24, wherein the value of the third token is the stored money value of the original token reduced by the stored money value of the second token.

26. The method of claim 22, wherein the request to purchase the at least one of a good and service corresponds to a disbursement of cash from the merchant to the consumer.

27. The method of claim 22, further comprising the step of ascertaining by the consumer from the clearing server a transaction history for the token corresponding to an identification number.

28. The method of claim 22, further comprising the step of requesting by the consumer to the clearing server a transfer of funds from the stored money value of the consumer's token corresponding to the identification number supplied by the consumer to another identification number corresponding to stored money value of another token, where the recipient token belongs to the same or different token user.

29. The method of claim 22, further comprising the step of requesting by the consumer to the clearing server a transfer of funds from the stored money value of the consumer's token corresponding to the identification number supplied by the consumer to a new token with a new identification number not belonging to any particular token user, said new token being assignable to a new token user.

30. The method of claim 22, comprising the steps of:
communicating by the consumer to a merchant a request to purchase from the merchant at least one of a good and service, the at least one of a good and service having a cost in a currency different from the currency on the stored money value of the token corresponding to the identification number supplied by the consumer;

retrieving the said token and key from the clearing server, converting the transaction amount to the currency of the said token; and debiting the token for the converted amount equivalent to the same amount in the currency of the merchant.

31. The method of claim 22, comprising providing credit to the token with a stored money value corresponding to the identification number supplied by the consumer.

32. The method of claim 22, wherein the request to purchase from the merchant by the consumer represents a contingent order including a consumer selected price for said at least one of a good and service, wherein the merchant commences with the financial transaction after the merchant decides to sell said at least one of a good and service to the consumer at the consumer selected price.

33. The method of claim 22 further comprising the step of transferring funds from the consumer's token to a bank account or issuing a check drawn against the stored money value of the said token.

34. The method of claim 30 comprising the steps of purchasing a new token with stored money value in one currency using for payment a token with stored money value in another currency;

selecting by the consumer, the currency and the stored money value for the new token;

submitting to the merchant the identification number corresponding to the consumer token with different currency to be used for payment;

downloading from the clearing server by the merchant the consumer's token with update key, debiting the consumer's token for an amount equivalent to the stored currency value of the new token to be purchased;

transferring from the merchant into a new token in a different currency, the money value for which the consumer's token has been debited;

providing to the consumer the identification number and pin corresponding to the new token having stored value in a different currency; and repeating the process as requested by consumer for different currencies.

35. The method of claim 30, comprising the steps of adding to an existing token money value in one currency using for payment another token with money value in a different currency.

36. The method of claim 22, wherein said token identification number is stored on media which may be read by conventional magnetic stripe readers or RFID receivers wherein transaction between a merchant and consumer is not limited to said consumer having a computer terminal interface.

37. The method of claim 22, wherein said token identification number may be transmitted to the merchant wirelessly to perform a transaction.

38. The method of claim 22, wherein said clearing server may be in the form of a group of clearing servers each holding a database of unique tokens wherein each token representing stored money value may be transferred between individual clearing servers during a transaction to reach the clearing server whereby a merchant requesting the said token obtains the lowest transaction cost.

39. The method of claim 35 wherein a token is permanently transferred from one clearing server to another clearing server which receives frequent merchant requests for the said token.

40. A method of performing micro-payment transactions between a consumer and a merchant, the consumer and the merchant utilizing computing devices connected to a network, the method comprising the steps of:

funding a token which is a digital representation of monies deposited, with additional money value determined by said consumer, said token or fractional token residing on a preselected clearing server, and said consumer receiving an identification number corresponding to said token;

communicating, during a financial transaction, by the consumer to the merchant a request to purchase from the merchant at least one of a good and service, the request including supplying by the consumer to the merchant an identification number corresponding to real stored money value on said token;

communicating, during the financial transaction, an authorization request by the merchant to a clearing server, the authorization request including the supplied identification number;

receiving from the clearing server by the merchant a token associated with said identification number having real money value;

receiving from the clearing server by the merchant a key for the merchant to have authorized access to change the stored money value of said token;

making monetary value changes on said consumer's token by said merchant utilizing said key from the clearing server;

modifying, during the financial transaction, the stored money value of the token corresponding to the identification number supplied by the consumer; and enabling the consumer to perform repeated financial transactions for small monetary amounts wherein said multiplicity of small transactions will not require having the merchant contact the clearing server to authorize each transaction or to issue a new token, said multiplicity of transactions continuing until said token expires, or its stored money value is exhausted or the consumer stops transacting.

41. The method of claim 22, further comprising the steps of:

commencing at least one additional financial transaction between the merchant and the consumer; and processing by the merchant of the at least one additional financial transaction by changing by the merchant the money value of the token in accordance with an amount of the at least one additional financial transaction without the merchant communicating with the clearing server.

42. The method of claim 22, further comprising the step of uploading by the merchant to the clearing server the token with the changed money value after completion of said at least one additional financial transaction between the merchant and the consumer.

43. The method of claim 22, wherein the step of requesting a token by the merchant from a clearing server includes the step of polling, by the clearing server, a previous merchant where said token was used last to obtain any changes to the money value of the token, prior to supplying the merchant with the token.

44. The method of claim 22, wherein the step of obtaining the requested token from the clearing server by the merchant represents a leasing of the token to said merchant; the method further comprising the step of the merchant carrying out additional transactions with the consumer while the token is leased to the merchant.

45. The method of claim 22, further comprising receiving by the merchant from the consumer an identification number and pin associated with a specific token; and wherein the step of requesting a token by the merchant from a clearing server is carried out by supplying by the merchant to the clearing server the token identification number and pin received from the consumer.

* * * * *